United States Patent
Chakrabarty et al.

(10) Patent No.: US 12,246,699 B2
(45) Date of Patent: Mar. 11, 2025

(54) SYSTEM AND METHOD FOR DATA-DRIVEN REFERENCE GENERATION

(71) Applicant: Mitsubishi Electric Research Laboratories, Inc., Cambridge, MA (US)

(72) Inventors: Ankush Chakrabarty, Cambridge, MA (US); Karl Berntorp, Cambridge, MA (US); Stefano Di Cairano, Cambridge, MA (US); Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 234 days.

(21) Appl. No.: 16/913,231

(22) Filed: Jun. 26, 2020

(65) Prior Publication Data
US 2021/0402980 A1    Dec. 30, 2021

(51) Int. Cl.
*B60W 30/00*    (2006.01)
*B60W 40/068*   (2012.01)
(Continued)

(52) U.S. Cl.
CPC .......... *B60W 30/00* (2013.01); *B60W 40/068* (2013.01); *B60W 40/107* (2013.01); *G01C 21/3453* (2013.01); *G05D 1/0212* (2013.01)

(58) Field of Classification Search
None
See application file for complete search history.

(56) References Cited

U.S. PATENT DOCUMENTS 9,058,036 B1 *   6/2015   Vian ................... G05B 13/041
9,139,204 B1 *   9/2015   Zhao .................. B60W 40/068
(Continued)

FOREIGN PATENT DOCUMENTS

CN    107168104 A  *  9/2017  ............. G05B 17/02
CN    110356404 A  * 10/2019  ............. B60W 10/06
(Continued)

OTHER PUBLICATIONS

Alessandro Balata, Michael Ludkovski, Aditya Maheshwari, Jan Palczewski "Statistical Learning For Probability-Constrained Stochastic Optimal Control" arXiv:1905.00107, published Apr. 30, 2019 (Year: 2019).*

(Continued)

*Primary Examiner* — Jelani A Smith
*Assistant Examiner* — Jacob Daniel Underbakke
(74) *Attorney, Agent, or Firm* — Gene Vinokur

(57) ABSTRACT

A controller is provided for operating a system under admissible states. The controller includes an interface configured to connect the system storing a set of measured system states, a set of reference inputs and a set of system parameters in a storage arranged inside or outside the system, a memory storing measured system states, admissible reference inputs and admissible parameter sets and computer-executable programs including a parameter estimator and an adaptive reference governor (ARG), a processor, in connection with the memory. The processor is configured to perform the ARG and the parameter estimator. The parameter estimator extracts a pair of a reference input and the system state and compute a system parameter estimate based on the reference input and system state. The ARG is configured to update the reference input and compute a parameter-robust constraint admissible set based on the updated reference input and the system states, wherein (Continued)

the ARG generates and transmits a reference input to the system based on the parameter-robust constraint admissible set.

11 Claims, 20 Drawing Sheets

(51) Int. Cl.
*B60W 40/107* (2012.01)
*G01C 21/34* (2006.01)
*G05D 1/00* (2024.01)

(56) References Cited

U.S. PATENT DOCUMENTS

| | | | | |
|---|---|---|---|---|
| 9,568,915 | B1* | 2/2017 | Berntorp | G05D 1/0214 |
| 9,804,580 | B2* | 10/2017 | Di Cairano | G05B 17/02 |
| 2010/0332070 | A1* | 12/2010 | Mueller | B60W 10/04 |
| | | | | 701/31.4 |
| 2014/0088803 | A1* | 3/2014 | Heap | B60W 20/20 |
| | | | | 180/65.265 |
| 2015/0284010 | A1* | 10/2015 | Beardsley | G08G 1/096816 |
| | | | | 701/1 |
| 2016/0147203 | A1* | 5/2016 | Di Cairano | G05B 13/042 |
| | | | | 700/30 |
| 2016/0357169 | A1* | 12/2016 | Di Cairano | G05B 19/106 |
| 2017/0301111 | A1* | 10/2017 | Zhao | H04N 17/002 |
| 2018/0009445 | A1* | 1/2018 | Nishi | B60W 50/06 |
| 2018/0017971 | A1* | 1/2018 | Di Cairano | B60W 30/02 |
| 2018/0170356 | A1* | 6/2018 | Lee | B60W 20/30 |
| 2019/0054955 | A1* | 2/2019 | Kalabic | G05D 1/0221 |
| 2019/0279090 | A1* | 9/2019 | Bose | G06N 3/08 |
| 2020/0023855 | A1* | 1/2020 | Takhirov | G07C 5/008 |
| 2020/0026296 | A1* | 1/2020 | Hoedt | B60W 20/11 |
| 2020/0089229 | A1* | 3/2020 | Lee | G05D 1/0212 |
| 2021/0271245 | A1* | 9/2021 | Bradley | G05D 1/0212 |

FOREIGN PATENT DOCUMENTS

| | | | | |
|---|---|---|---|---|
| DE | 102017004897 | A1 * | 11/2017 | B60W 10/04 |
| GB | 2549320 | A * | 10/2017 | B60W 10/04 |

OTHER PUBLICATIONS

Kenji Hirata, Masayuki Fujita "Set of Admissible Reference Signals and Control of Systems with State and Control Constraints" Proceedings of the 38th IEEE Conference on Decision and Control, Dec. 1999 Accessed from IEEE Xplore (Year: 1999).*

E. Kyriakides and G. T. Heydt, "Calculating confidence intervals in parameter estimation: a case study," in IEEE Transactions on Power Delivery, vol. 21, No. 1, pp. 508-509, Jan. 2006, doi: 10.1109/TPWRD.2005.848440. (Year: 2006).*

A. Bemporad and E. Mosca, "Nonlinear predictive reference governor for constrained control systems," Proceedings of 1995 34th IEEE Conference on Decision and Control, New Orleans, LA, USA, 1995, pp. 1205-1210 vol. 2, doi: 10.1109/CDC.1995.480261. (Year: 1995).*

Nezvadovitz, Jason. "Observer-Side Parameter Estimation For Adaptive Control." arXiv preprint arXiv:1711.09154 (2017). (Year: 2017).*

P. Andonov, A. Savchenko and R. Findeisen, "Controller Parametrization for Offset-free Control Using Set-Based Feasibility Methods," 2019 American Control Conference (ACC), Philadelphia, PA, USA, 2019, pp. 2795-2800, doi: 10.23919/ACC.2019.8815351. (Year: 2019).*

P. Andonov, B. Morabito, A. Savchenko and R. Findeisen, "Admissible Control Parametrization of Uncertain Finite-time Processes With Application to Li-ion Battery Management," 2018 European Control Conference (ECC), Limassol, Cyprus, 2018, (Year: 2018).*

* cited by examiner

SYSTEM AND METHOD FOR DATA-DRIVEN REFERENCE GENERATION

TECHNICAL FIELD

The invention relates generally to a system and method for motion control of a machine, and more particularly to a system and a method for data-driven reference generation for constraint satisfaction in machines with closed-loop control systems and uncertain dynamics or parameters.

BACKGROUND

Motion control systems are used in number of positioning applications, e.g., single-axis positioning, and multiple-axis positioning. For example, a simple single-axis positioning motion control system generally includes sensors, controller, amplifier, and actuator motor. The actuator follows a predetermined trajectory subject to input and output constraints, e.g., dynamics, acceleration, velocity.

Reference governors (RGs) are add-on schemes for enforcing pointwise-in-time input and output constraints by modifying the reference input to closed-loop feedback control systems. For ensuring repeated constraint satisfaction, RGs leverage particular invariant sets known as constraint admissible sets. Due to their ability to enforce constraints without requiring a full re-design, and with a relatively low computational burden, RGs have proven useful in multiple application domains, including vehicles, aerospace, manufacturing, and energy systems; see, for example, the survey for an extensive list of contributions. When the parameters of the underlying systems are uncertain, robust formulations of RG may be applied based on robust set invariance. On the other hand, such robust formulations are based on the assumption that the uncertain parameters are constantly varying, and as such, they are overly conservative in the cases where the unknown parameters are constant or slowly-varying.

Despite being relatively common in real-world applications, there are relatively few designs for RGs in this case. To the best of our knowledge, the conventional load governor approach proposed is the only parameter-adaptive reference governor (PARG) formulation in the literature. A major reason for the dearth of PARG frameworks is that the computation of robust constraint admissible sets under parameter uncertainty is extremely difficult due to complex geometries of these sets and inherent non-convexity, even for linear systems. It is common to circumvent this issue by local linearization, but such an approximation tends to still be conservative. In addition, several methods involve simulating multiple trajectories on-line for various references and unknown parameter values, and checking constraint satisfaction, all of which leads to an increase in computational load. Recently proposed sampling-driven machine learning approaches may provide computationally tractable and efficient frameworks for estimating these robust invariant sets on-line by offloading simulation and trajectory generation off-line.

For linear systems with unknown parameters, Kalman-type approaches have been widely reported to be effective. For nonlinear systems, these approaches are generally intractable, and particle filtering provides an effective alternative, where the state space is estimated by predicting state trajectories (particles) and weighting them according to the likelihood of the measurements. A general framework for parameter estimation with particle filters can be also found.

Since recursive parameter estimators result in time-varying confidence intervals, determining the robust parameter invariant sets is a dynamic learning problem. Specifically, for a fixed set of samples, the time-varying confidence intervals result in time-varying labeled/target sets for the learner. Hence, the learner has to be updated on-line in order to provide improved estimates of the robust constraint admissible sets based on the time-varying confidence intervals.

Consequently, there is a requirement for a PARG framework that is capable of enforcing constraints in parameter-uncertain closed-loop systems without modifying the control algorithm directly.

SUMMARY

Some embodiments of the present disclosure are based on recognition that a PARG framework is capable of enforcing constraints in parameter-uncertain closed-loop systems without modifying the control algorithm directly. As a specific realization of this PARG framework, we consider two components: (i) a recursive parameter estimator for generating confidence intervals around a point estimate of the unknown parameter; and (ii) a supervised learning algorithm that dynamically learns constraint admissible sets by combining off-line data based on sampling, and on-line data provided by the parameter estimator. An advantage of using interval-based estimates rather than point estimates of the parameter, is that the intervals can exhibit certain properties such as monotonicity that are crucial to ensure performance guarantees on the PARG. Another advantage of our proposed method is that learners with good approximation properties, such as with universal kernels, can be employed to efficiently represent highly non-convex robust constraint admissible sets for black-box systems using simulations and systematic sampling; this is extremely challenging via analytical methods.

Some embodiments provide sampling-based approaches to generate features and labels off-line, iteratively update the robust constraint admissible sets on-line as more data becomes available and the confidence in the parameter estimates improves. In order to construct robust constraint admissible sets, one requires not only the point estimates of the parameters themselves, but also regions in the parameter space within which the true parameter lies with high confidence, ascertained by a probability. To this end, some embodiments provide the use of recursive parameter estimators that can demonstrate excellent performance in a wide range of estimation problems.

Some embodiments of the present disclosure are based on recognition that the RGs provide an effective method for ensuring safety via constraint enforcement in closed-loop control systems. When the parameters of the underlying systems are unknown, but constant or slowly-varying, robust formulations of RGs that consider only the worst-case effect may be overly conservative and exhibit poor performance. This disclosure discloses a PARG architecture that is capable of generating safe trajectories in spite of parameter uncertainties without being as conservative as robust RGs. Some embodiments leverage on-line data to inform algorithms for robust parameter estimation. Subsequently, confidence bounds around parameter estimates are fed to supervised machine learners for approximating robust constraint admissible sets leveraged by the PARG. While initially, due to the absence of on-line data, the PARG may be as conservative as a robust RG, as more data is gathered and the confidence bounds become tighter, and conservativeness reduces.

Further, according to some embodiments of the present disclosure, a controller is provided for operating a system under admissible states. The controller may include an interface configured to connect the system storing a set of measured system states, a set of reference inputs and a set of system parameters in a storage arranged inside or outside the system; a memory storing measured system states, admissible reference inputs and admissible parameter sets and computer-executable programs including a parameter estimator and an adaptive reference governor (ARG); a processor, in connection with the memory, configured to perform the ARG and the parameter estimator, wherein the parameter estimator extracts a pair of a reference input and the system state and compute a system parameter estimate based on the reference input and system state, wherein the ARG is configured to update the reference input and compute a parameter-robust constraint admissible set based on the updated reference input and the system states, wherein the ARG generates and transmits a reference input to the system based on the parameter-robust constraint admissible set.

Some embodiments are based on realization that shows a control system for controlling a vehicle moving on a road, e.g., controlling the vehicle according to a reference trajectory of desired vehicle positions and velocities along the road. This embodiment is based on the recognition that the stiffness determined for normal driving can be used to select from a memory one of the multiple parameters of friction functions. The method can be implemented using a processor of the vehicle.

To that end, the control system may include a controller of claim 1 including an adaptive reference governor (ARG), wherein the ARG generates the control commands to vehicle controllers of the vehicle. In this case, the ARG may include a sensing system configured to measure inertial components of the vehicle; a signal conditioner configured to output an estimate of a longitudinal acceleration; and a state-of-stiffness estimator configured for determining parameters of a state of a stiffness.

Another embodiment discloses a motion control system for controlling a motor. The motion control system may include one or more combination of motion controllers configured to transmit control signals to a motor amplifier; an adaptive reference governor (ARG)-trajectory generator, wherein the ARG-trajectory generator includes a controller of claim 1 including an adaptive reference governor (ARG), wherein the ARG-trajectory generator generates and transmits control commands to the one or more combination of the motion controllers.

Yet another embodiment discloses a method for controlling a system. The method may include acquiring system states, reference inputs and system parameters from a set of measured system states, a set of admissible reference inputs and a set of admissible system parameters, wherein the set of measured system states, the set of admissible reference inputs and the set of admissible system parameters have been collected during past operations and current operations of the system; providing a system state estimate, a reference input, a system parameter estimate and a desired reference to an adaptive reference governor (ARG); transmitting a reference input generated by the ARG to a system; extracting and providing a pair of the reference input and the system state estimate to a parameter estimator; computing a boundary interval of parameters using the parameter estimator; updating the reference input using the ARG; and computing a parameter-robust constraint admissible set using the ARG based on the updated reference input and system states.

Further, another embodiment discloses a non-transitory computer readable storage medium embodied thereon a program executable by a processor for performing a method, the method includes acquiring system states, reference inputs and system parameters from a set of measured system states, a set of admissible reference inputs and a set of admissible system parameters, wherein the set of measured system states, the set of admissible reference inputs and the set of admissible system parameters have been collected during past operations and current operations of the system; providing a system state estimate, a reference input, a system parameter estimate and a desired reference to an adaptive reference governor (ARG); transmitting a reference input generated by the ARG to a system; extracting and providing a pair of the reference input and the system state estimate to a parameter estimator; computing a boundary interval of parameters using the parameter estimator; updating the reference input using the ARG; and computing a parameter-robust constraint admissible set using the ARG based on the updated reference input and system states.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1:
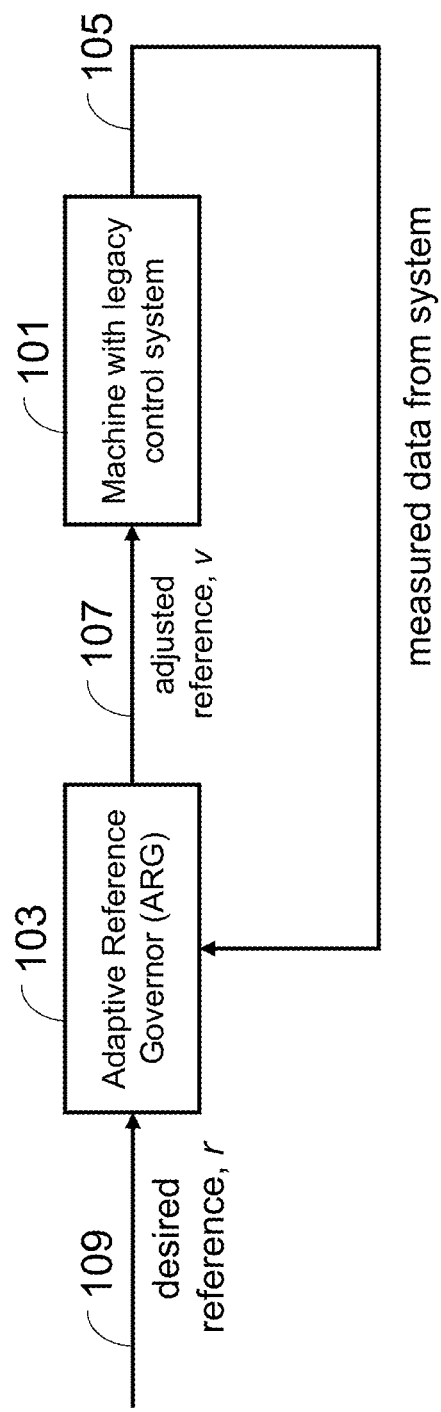
FIG. 1 is a schematic of the data-driven adaptive reference governor used for generating constraint-admissible reference trajectories for the control of a machine with a legacy control system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

FIG. 1 shows an example of a controlled machine, such as a machine, controlled by a previously designed legacy controller capable of tracking desired references 109, according to some embodiments. Together, we refer to the machine and the legacy controller as the legacy control system 101. The legacy system 101 can be a mechanical system, chemical system, or electrical system such as a motor drive, robot, automobile, or the like. The controlled machine 101, owing to wear and tear or external environmental factors such as temperature or wind resistance variation, contains parametric uncertainties such as unknown physical parameters or unmodeled dynamics, which can lead to constraint violation when using the legacy controller alone. Examples of unknown physical parameters include loads on a robotic manipulator while unmodeled dynamics include nonlinear friction effects during tire skidding. To enforce constraint satisfaction, in some implementations, an adaptive reference governor (ARG) 103 adjusts the desired reference 109 to a constraint-admissible reference 107 using the data 105 obtained during the operation of the machine 101. The data 105 can include state, output, and/or references obtained at the current time or stored from previous times.

Figure 2:
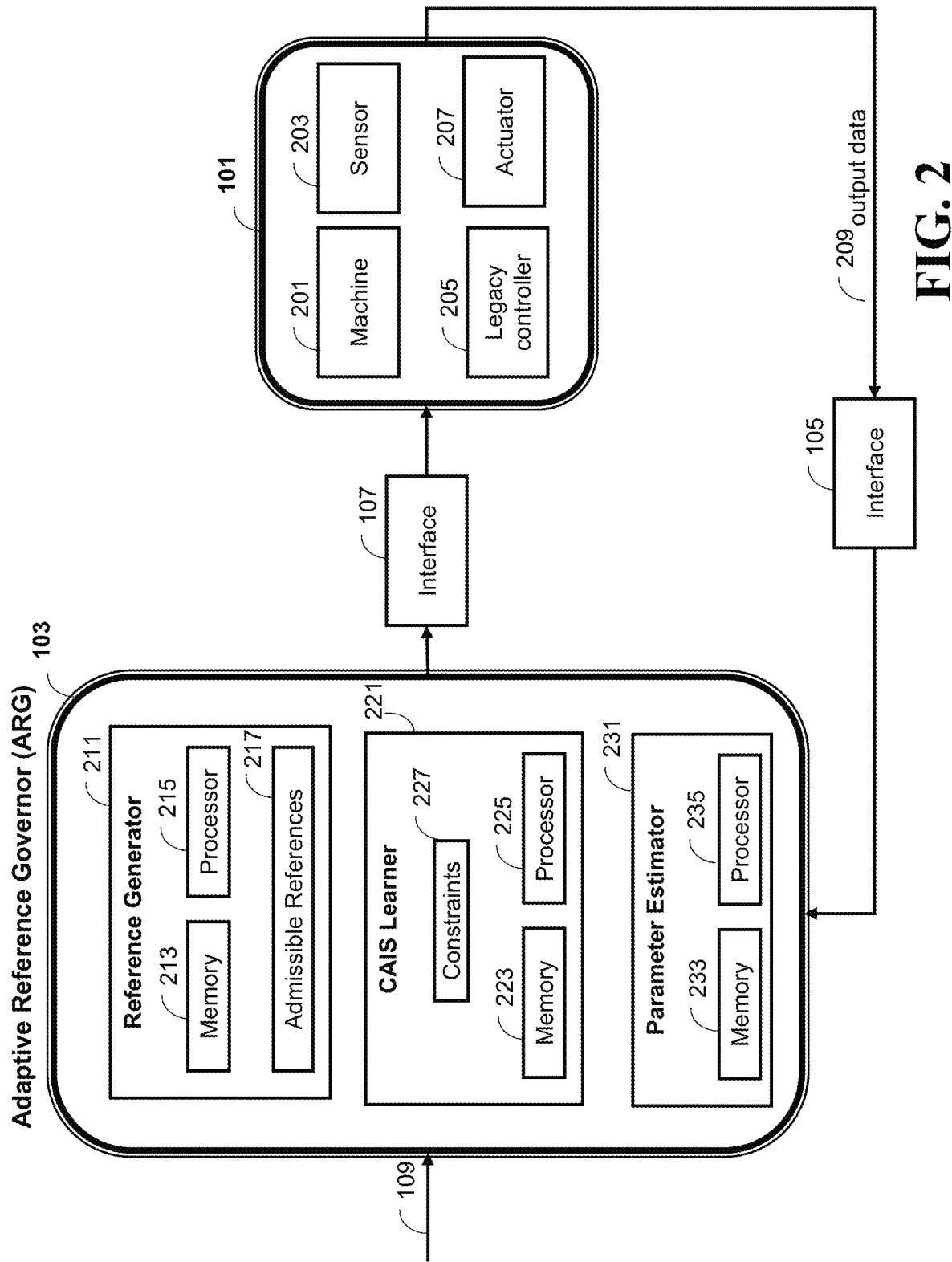
FIG. 2 is a schematic illustrating the individual components of an embodiment of the adaptive reference governor along with interfacing with a controlled machine with a legacy control system in place, according to some embodiments of the present disclosure.

FIG. 2 describes the components of the data-driven adaptive reference governor 103 interfaced with a machine controlled by a legacy control system 101. The machine 201, as used herein, is any apparatus that can be controlled to a desired reference input signal (reference). The desired reference signal 109 can be associated with physical quantities, such as desired voltages, pressures, forces, etc. The machine produces an output signal (output). The output can represent a motion of the machine and can be associated with other physical quantities, such as currents, flows, velocities, positions. Typically, the output is related to a part or all of the previous output signals, and to a part or all of the previous and current input signals. However, the outputted motion of the machine may not be realizable due to constraints on the machine during its operation. The input and output are processed by a controller.

The operation of the machine 201 can be modeled by a set of equations representing changes of the output over time as functions of current and previous inputs and previous outputs. During the operation, the machine 201 can be defined by a state of the machine. The state of the machine is any set of information, in general time varying, that together with the model and future inputs, can define future motion. For example, the state of the machine 201 can include an appropriate subset of current and past inputs and outputs.

The legacy tracking controller 205 can be implemented in hardware or as a software program executed in a processor (hardware processor), e.g., a microprocessor, which at fixed or variable control period sampling intervals receives the estimated state 203 of the machine 201 and the adjusted reference input 107 and determines, using this information, the inputs to the actuator 207 used for operating the machine. The sensor 203, at fixed or variable period sampling intervals, receives the outputs of the machine 201 and sends this output data 209 to the ARG 103 via the interface 105. Examples of the interface 105 includes network control interface configured to accept data transmitted thorough wired or wireless communication channel. These outputs can be one or a combination of measurements, states, and references of the legacy control system 101 at the current time or stored in memory at some previous time instants.

In some embodiments, the ARG 103 has the following modules: a parameter estimation module 231, a constraint-admissible invariant set (CAIS) learning module 221, and a reference generation module 211.

The parameter estimator 231 estimates the parametric uncertainty in the machine using the output data 209 or some transformation of this data. The parameter estimator 231 usually consists of estimation algorithms deployed on a processor 235 that uses stored data in memory 233, including stored previous state estimates, parameter estimates, covariance matrices, and so on. Examples of parameter estimator 231 can include: linear and nonlinear observers or Kalman filters with state augmentation, and recursive least squares filters when full state feedback is available. Estimated parameters could include a mass of a vehicle, an inertia of a vehicle, a tire friction coefficient of at least one tire mounted on a vehicle, or viscous damping coefficients in servomotors.

The machine 201 and control system is designed to satisfy constraints 227 that arise from safety considerations, physical limitations, and/or specifications, limiting the range where the outputs, the inputs, and also possibly the states of the machine are allowed to operate. The constraints 227 are defined in continuous space. For example, state constraints are defined in continuous state space of the machine and reference input constraints are defined in continuous reference input space. The CAIS learning module 221 takes outputs of the parameter estimator 231, along with features and labels stored in the memory 223 to generate constraint-admissible sets using the CPU/GPU or combination thereof in the processor 225 for use in the reference generator module 211.

Given a desired reference input 109 such as a desired velocity to be tracked in cruise control, or a desired torque in a servomotor, the reference generator unit 211 adjusts this desired reference input r to an adjusted reference input v using the CAIS generated by the CAIS learner 221. The adjusted reference input belongs to a set of admissible references 217, such as limits on velocities in highway driving between 50 and 80 miles per hour. The reference generator accesses its memory 213 to find the adjusted reference in the previous time instant and updates that to compute the new adjusted reference using computations in the processor 215. The adjusted reference input is connected with the legacy controlled machine via the interface 107 and is guaranteed to enforce constraints 227 without altering the structure of the legacy control system 101.

Figure 3:
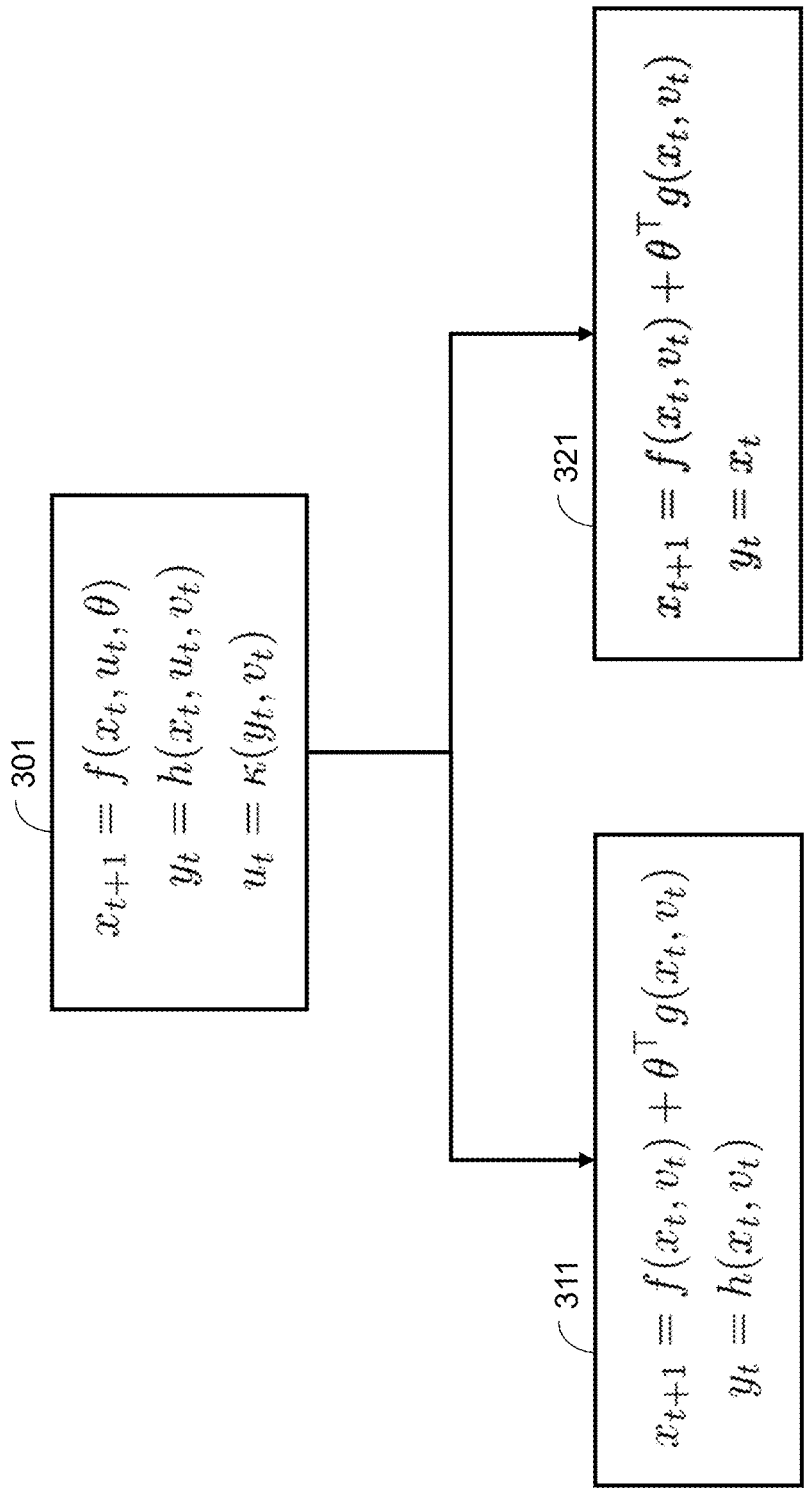
FIG. 3 shows dynamical models of the legacy controlled machine, according to some embodiments of the present disclosure.

FIG. 3 illustrates some embodiments of a dynamical machine with uncertain parameters and legacy controllers. A general structure of the dynamical model of the legacy control system 103 is given by the dynamical model 301, where t is the time index, $x \in \mathbb{X} \subset \mathbb{R}^{n_x}$ denotes the system state, $u \in \mathbb{R}^{n_u}$ is the control input from the legacy controller $\kappa(y, v)$ which depends on the output $y \in \mathbb{R}^{n_y}$ and the adjusted reference input $v \in \mathbb{V} \subset \mathbb{R}^{n_v}$. The output function is given by h and the legacy controller is designed so that the output y tracks the reference v. The uncertain parameters of the model are denoted by $\theta \in \Theta \subset \mathbb{R}^{n_\theta}$. In one embodiment, the uncertain parameter acts linearly in the dynamical model representation 311 but the measured output is a nonlinear transformation of the state and adjusted reference (output-feedback). In another embodiment of a dynamical model 321, the uncertain parameter acts linearly in the dynamics, but the output is the full state of the system (state-feedback).

According to some embodiments, the output of the legacy control system 103 must satisfy constraints described by the set for each instant of time, that is $y_t \in \mathbb{Y} \subset \mathbb{R}^{n_y}$ for every time t≥0. The sets $\mathbb{X}$, $\mathbb{V}$, $\mathbb{Y}$ and $\Theta$ are compact and known by the designer. The sets $\mathbb{X}$, $\mathbb{V}$, $\mathbb{Y}$ contain the origin in their interiors. The set $\mathbb{V}$ is convex. The set $\Theta$ denotes prior knowledge on the range of system parameters, for example, loads on a robotic manipulator will have a specified range such as [0, 10] lb. In some embodiments, both the reference input and output are scalars.

In the unconstrained setting, that is $\mathbb{Y} = \mathbb{R}^{n_y}$, the legacy system exhibits good tracking performance. Thus, the legacy system is asymptotically stable and for each $r \in \mathbb{V}$, when $v_t = r_t \equiv r$ for all t≥0, $y_t \to r$ as $t \to \infty$. The objective of a reference governor is to select $v_t$ as close as possible to $r_t$ while ensuring that the constraints $y_t \in \mathbb{Y}$ is enforced.

Figure 4A:
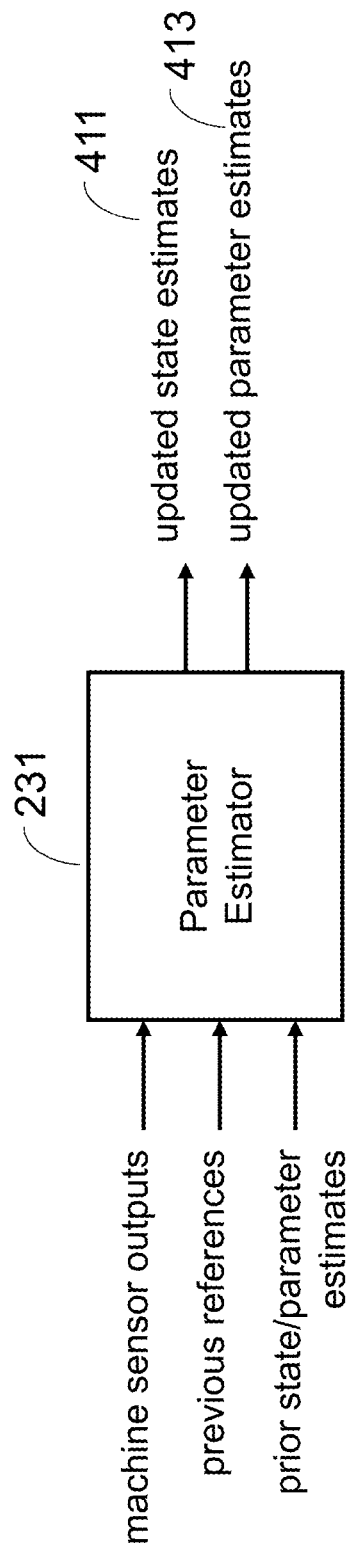
FIG. 4A is a schematic illustrating the inputs and outputs of a parameter estimator, according to some embodiments of the present disclosure.

FIG. 4A describes a schematic diagram of the parameter estimator 231 according to some embodiments. The overall function of the estimator is to generate parameter, and if required, state estimates of the machine based on sensor outputs and prior references, along with prior state and parameter estimates. For dynamical models 311 that do not have full state feedback, one exemplar parameter estimator is a particle filter. For dynamical models with full state feedback 321, an exemplar parameter estimator is a Kalman filter. The parameter estimator 231 uses measurements made during the operation of the system and generates estimates of the system states 411 and estimates of the uncertain parameters of the system 413.

Figure 4B:
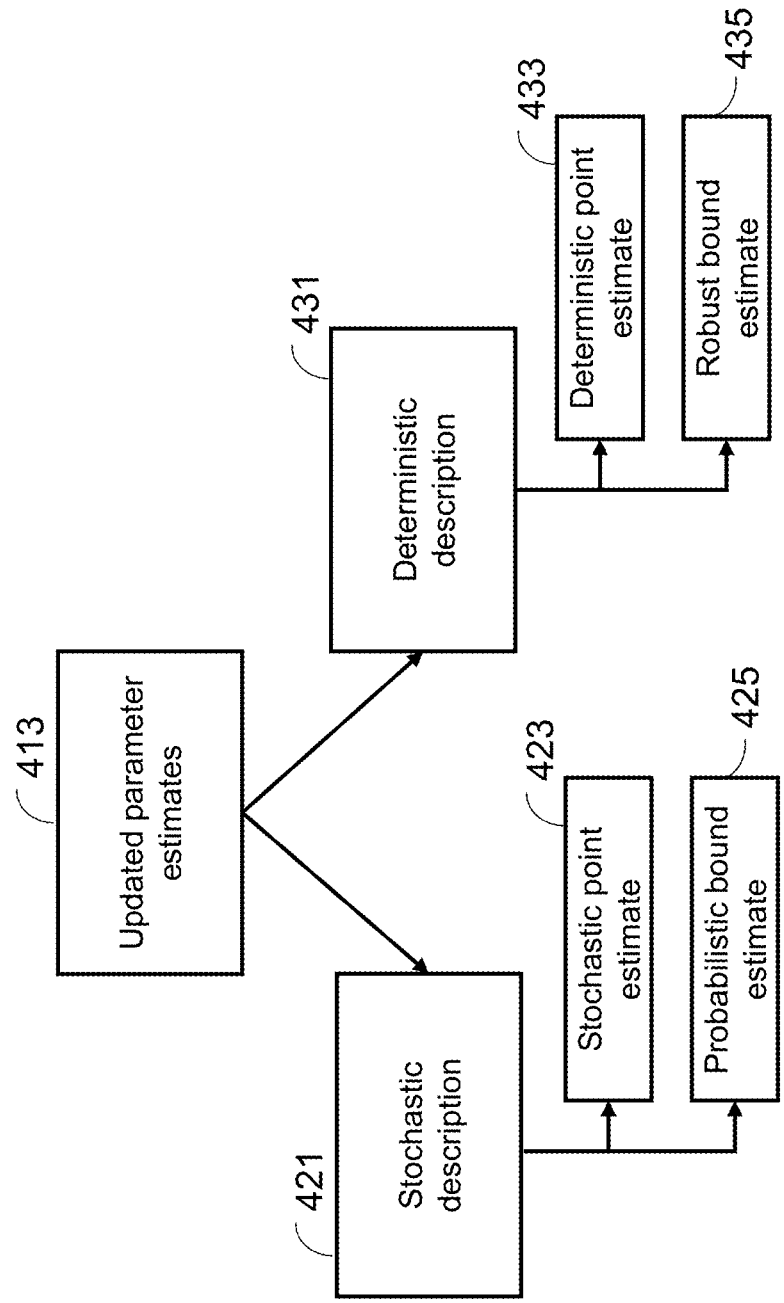
FIG. 4B shows the parameter estimator and estimated information provided by different classes of estimators, according to some embodiments of the present disclosure.

FIG. 4B is a diagram describing the parameter estimates 413, according to embodiments of the present disclosure. Depending on the parameter estimator selected, the parameter estimates 413 can be estimated with stochastic descriptions 421, such as a point estimate 423 like an average or expectation from a Bayesian estimator, along with a probabilistic bound 425 on the statistics of the estimate such as a confidence interval. Conversely, with deterministic parameter estimators such as unknown input observers or interval observers, one can obtain one or a combination of a deterministic point estimate 433 along with a robust bound estimate 435 such as an $\mathcal{L}_\infty$ bound on the parameters. The advantage of using confidence intervals instead of point estimates is that they can be made to exhibit certain useful properties such as non-expansivity as more data becomes available. Unlike point estimates, which can be time-varying and unpredictable, confidence intervals can be designed to exhibit predictable dynamics, making them effective for constraint enforcement.

In one embodiment, the machine 201 with the uncertain dynamics may be given by $$x_{t+1} = f(x_t, v_t) + \theta^T g(x_t, v_t), y_t = x_t \quad (1)$$

An efficient way of determining such confidence intervals for machine with this class of uncertain dynamics is by using Kalman filters and adaptive particle filters. We do this by reformulating the dynamics (1) in a probabilistic framework where θ is treated as an unknown disturbance with stochastic properties. In the current embodiment, since $x_t$ is known, we exploit the linearity of the system (1) with respect to θ and use a Kalman filter for estimating $\theta$ and its confidence interval $\Theta_t$. Note that the approach can be extended to the case when the state vector is not completely known and has to be estimated together with the parameter. Specifically, we reformulate (1) as $$\theta_t = \theta_{t-1} + w_t, \quad (2)$$

$$\bar{y}_t = g(x_{t-1}, v_{t-1})^T \theta_t + e_t, \quad (3)$$

where $\bar{y}_t = x_t^T - f^T(x_{t-1}, v_{t-1})$, that is, the dynamical system (1) for $x_t$ now plays the role of the measurement (output) equation in the Kalman filter.

The reason to address the parameter estimation problem in a Bayesian framework is that even if the state $x_t$ is known, for instance, from measurements, such knowledge is typically imperfect due to inherent noise in the sensors measuring the state, even though we do not model the uncertainties explicitly in (1) for simplicity. Furthermore, a Bayesian framework provides a systematic approach to work with confidence intervals in recursive estimators. In a Bayesian context, we update the uncertainty $\theta_{t+1}$:$p(\theta_t)$ and $\bar{y}_t$:$p(\theta_t)$. We address the parameter estimation problem by recursively estimating the posterior density function of the parameter $\theta_t$, given by $$p(\theta_t | \bar{y}_{0:T}). \quad (4)$$

using the measurement history $\bar{y}_{0:T} = \{\bar{y}_0, \ldots, \bar{y}_T\}$. The Bayesian updates for solving (4) can be summarized in the prediction and update equations $$p(\theta_t | \bar{y}_{0:t-1}) = \int p(\theta_t | \theta_{t-1}) p(\theta_{t-1} | \bar{y}_{0:t-1}) d\theta_{t-1}, \quad (5)$$

$$p(\theta_t | \bar{y}_{0:t}) = \frac{p(\bar{y}_t | \theta_t) p(\theta_t | \bar{y}_{0:t-1})}{p(\bar{y}_t | \bar{y}_{0:t-1})}, \quad (6)$$

where $P(\bar{y}_t | \bar{y}_{0:t-1})$ is a normalization constant. If the process noise and measurement noise are Gaussian distributed, then the Bayesian update recursions (5-6) result in the Kalman filter equations that estimate the parameter mean and associated covariance. Using the covariance, we estimate the confidence interval $\hat{\Theta}$ as $$\hat{\Theta}_t^j = [\hat{\theta}_t^j - \beta P_t^{jj}, \hat{\theta}_t^j + \beta P_t^{jj}]$$

for each element $j$ in the parameter vector $\theta_t$ and $\beta > 0$.

In order to provide theoretical guarantees on the PARG, some embodiments ensure that the confidence intervals do not expand with more available data, that is, $\hat{\Theta}_{t+1} \subseteq \hat{\Theta}_t$. While this is a natural consequence of applying Kalman filters to linear-in-parameter systems such as (1), in general, exploration using nonlinear filters such as in particle filters could result in a violation of this condition. In such scenarios, one embodiment explicitly enforces contraction of confidence intervals. Specifically, if the filter computes an updated confidence interval $\tilde{\Theta}_{t+1}$, we set $$\hat{\Theta}_{t+1} := \begin{cases} \hat{\Theta}_t \cap \tilde{\Theta}_{t+1} & \text{if } \tilde{\Theta}_{t+1} \cap \hat{\Theta}_t \neq \emptyset \\ \hat{\Theta}_t, & \text{otherwise.} \end{cases} \quad (7)$$

This forces non-expansion of $\hat{\Theta}_t$ for all $t \geq 0$.

If the state vector is available at every $t$, one can use a linear estimator to provide the confidence intervals, and, therefore, a more general approach using Bayesian recursions is not needed. However, if the state is unavailable, the updates (5-6) can be employed to generate joint estimates of states and parameters via nonlinear recursive estimators.

Figure 5A:
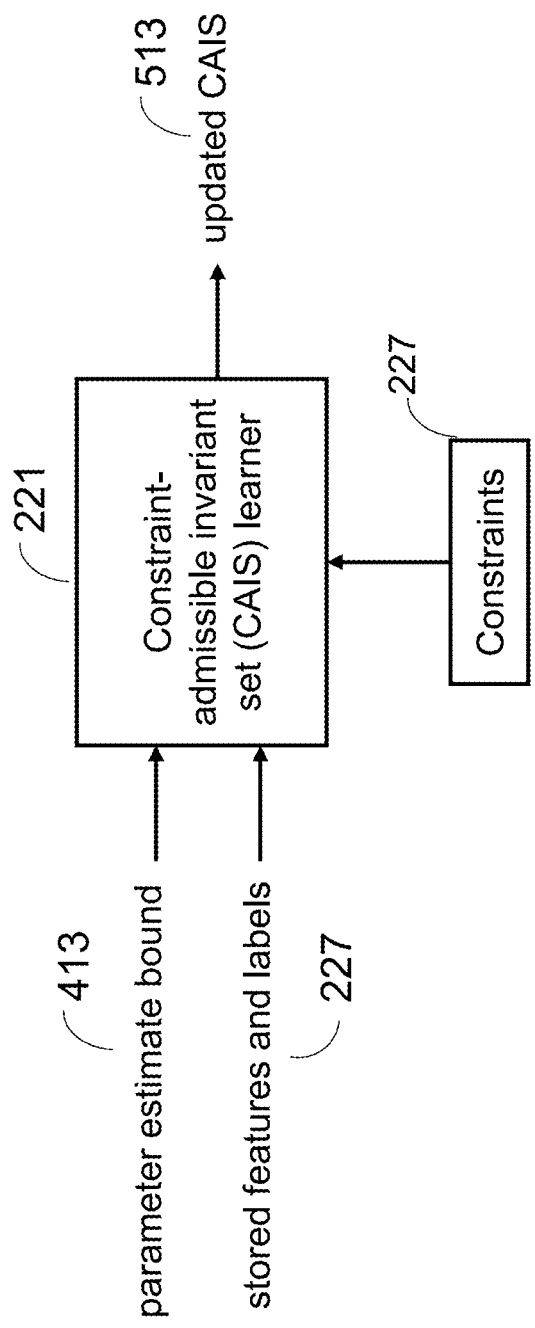
FIG. 5A is a schematic illustrating the inputs and outputs in a learning module that generates constraint-admissible sets from parameter estimate information, according to some embodiments of the present disclosure.

FIG. 5A provides a block representation of the CAIS learner 221 that leverages the parameter estimate bound 413 from the parameter estimator and stored state features and constraint-admissibility labels 227 in order to learn an updated CAIS given the constraints, according to some embodiments.

A tool used to satisfy constraints despite parametric uncertainty is a parameter-robust constraint admissible invariant set, referred to here as CAIS for brevity. More formally, let $H = \{(x, v) \in X \times V : h(x, v) \in Y\}$ denote the set of state and reference inputs for which the output y satisfies the constraints. We present the following definition for parameter-robust constraint admissible sets: The set $O(\hat{\Theta}) \subseteq H$ is a parameter-robust constraint admissible set for the closed-loop system if, for every initial condition $(x, v) \in O(\hat{\Theta})$ when $x_0 = x$ and $v_t = v$ for all $t \geq 0$, $(x_t, v_t) \in H$ for every $\theta \in \hat{\Theta}$ and for all $t > 0$. The set $O(\hat{\Theta})$ is invariant. In order to generate estimates of parameter-robust constraint admissible sets, we will adopt an off-line sampling-driven approach to collect data for learning the sets on-line as operational data becomes available.

An estimate of a parameter-robust constraint admissible set can subsequently be used to evaluate the control law $$v_t = \bar{G}(v_{t-1}, x_t, \hat{\Theta}_t, r_t) = v_{t-1} + G(v_{t-1}, x_t, \hat{\Theta}_t, r_t)(r_t - v_{t-1}),$$

by solving for $$G(v_{t-1}, x_t, \hat{\Theta}_t, r_t) := \mathrm{argmin}_{\gamma_t}(v_t - r_t)^2 \quad (8)$$

$$\mathrm{subject\ to}: (v_t, x_t) \in O(\hat{\Theta}_t),$$

$$v_t = v_{t-1} + \gamma_t(r_t - v_{t-1}),$$

$$0 \leq \gamma_t \leq 1,$$

$$v_t \in V_\varepsilon(\hat{\Theta}_t)$$

at each time instant $t$. Note that $V_\varepsilon(\hat{\Theta}_t)$ denotes the set of references $v$ such that a ball of radius $\varepsilon > 0$ centered at the corresponding steady state $x^{ss}(v, \theta)$ and $v$ lies inside $O(\hat{\Theta}_t)$.

Some embodiments simulate trajectories of the legacy system off-line, from different initial states sampled from $\mathbb{R}$, reference inputs sampled from $\mathbb{V}$, and parameters within $\Theta$. At the end of each off-line simulation, if an initial condition $x_i \in \mathbb{R}$ tracks a desired reference input $v_j \in \mathbb{V}$ without violating the constraint (3) at any time in the simulation, for a parameter $\theta_i$ sampled within $\Theta$, then the feature $(x_i, v_i)$ is labeled '+1' to indicate it resides within the parameter-robust constraint admissible set $\mathcal{O}(\theta_i)$. Contrarily, if the constraint is violated at any time point in the simulation, the feature is labeled '-1' to indicate it resides outside $O(\theta_i)$. This sets up a binary classification problem which can be solved via supervised machine learning.

Figure 5B:
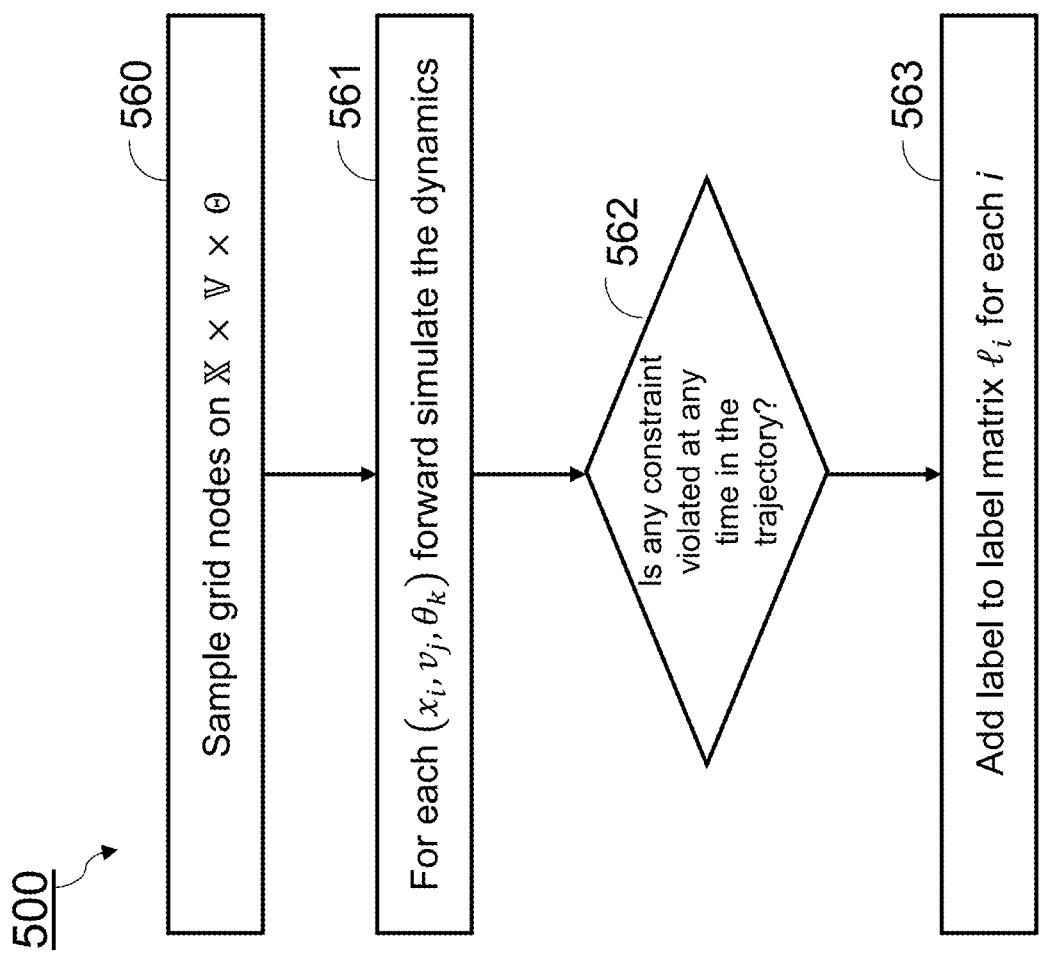
FIG. 5B shows the flowchart of operations required to generate the offline features and labels, according to some embodiments of the present disclosure.

FIG. 5B shows a flowchart of operations (operation method 500 being a computer executable program) required to generate the offline features and labels according to some embodiments. In this case, the method 500 extracts $N_x$ unique samples from X and construct grids (not necessarily equidistantly spaced) on V and $\Theta$ with $N_v$ and $N_\theta$ nodes 560, respectively. Let $x_i$ denote the i-th sampled state, $v_j$ the j-th sampled reference input, and $\theta_k$ the k-th sampled parameter. For each $(x_i, v_j, \theta_k)$, the method 500 simulates 561 the dynamical model 301/311/321 forward in time over a finite horizon $T_s$ with a constant reference $v_j$ and parameter $\theta_k$. The horizon $T_s$ is chosen long enough that the tracking error is small (for example, $<10^{-6}$) by the end of the simulation. For each simulation, we check whether $y_t \in Y$ for every simulation time-point 562. We set the corresponding label of the sample $x_i$ as follows:

$$\ell_i^{j,k} = \begin{cases} +1, & \text{if } y_t \in Y \text{ for every } t \in \{0, 1, \ldots T_s\}, \\ -1, & \text{otherwise.} \end{cases} \quad (9)$$

At the end of this off-line data generation procedure, the method 500 includes a fixed collection of initial $\{x_i\}_{i=1}^{N_x}$, and each initial condition $x_i$ has a corresponding $N_v \times N_\theta$ matrix of labels 563

$$\ell_i = \begin{bmatrix} \ell_i^{1,1} & \cdots & \ell_i^{1,N_\theta} \\ \vdots & \ddots & \vdots \\ \ell_i^{N_v,1} & \cdots & \ell_i^{N_v,N_\theta} \end{bmatrix},$$

from which a labeled set will be generated on-line for robust invariant set estimation using supervised learning. Note that every element in $l_i$ is either +1 or −1 by (9).

In order to solve the reference generation problem, some embodiments require an estimate of the set $O(\hat{\Theta}_t)$, which can be obtained using machine learning.

In some embodiments, the learning problem is set up as follows. At time instant t, consider a $\hat{\Theta}_t$ provided by the parameter estimator. Then, for each $v_j \in \tilde{V}_t$ described in (10), and each $x_i \in \{x_i\}_{i=1}^{N_x}$ sampled off-line, we assign the label $$z_{i,j}(\hat{\Theta}_t) = \min_{k \in |i,j(\hat{\Theta}_t)} \ell_i^{j,k}, \text{ where } \Big|(\hat{\Theta}_t) := \{k : \theta_k \in \hat{\Theta}_t\}\Big|_{i,j}$$

is the index set of parameters contained in the current confidence interval $\hat{\Theta}_t$. Taking the minimum ensures that the estimated set is robust to all parameters within $\hat{\Theta}_t$. That is, if even one $\theta_t$ is infeasible for the particular $v_j$ and $x_i$, then $x_i$ does not belong to the robust parameter invariant set corresponding to $\hat{\Theta}_t$.

With the training data $D := \{(x_i, v_j), z_{i,j}\}$, we construct classifiers $\psi_j$, where $j = 1, \ldots, |\tilde{V}_t|$. For each $v_j$, a classifier is trained on features $\{x_i\}$ and their corresponding labels $\{z_{i,j}\}$. These classifiers need to represent inner approximations of the robust parameter invariant sets; to this end, one may select sub-level sets of the decision boundary $\psi_k = 0$ of the classifier until no infeasible sample is contained in the interior of the sub-level set.

Figure 5C:
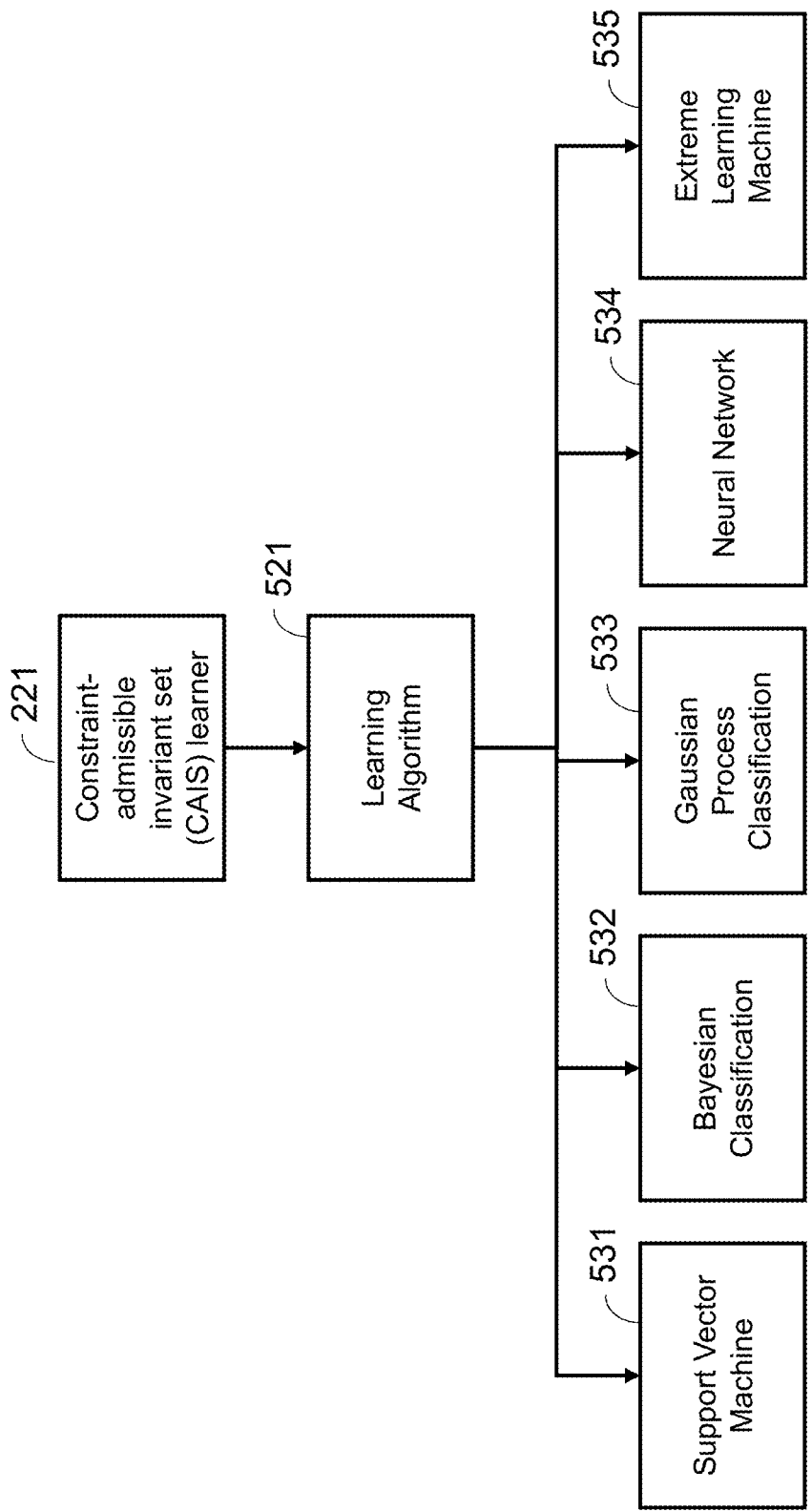
FIG. 5C shows various examples of bi-classification machine learning algorithms that can be used in the CAIS learner module, according to some embodiments of the present disclosure.

FIG. 5C shows various examples of bi-classification machine learning algorithms that can be used in the CAIS learner module, according to embodiments of the present disclosure.

The figure provides some learning algorithms 521 that can compute the set $O(\hat{\Theta}_t)$ up to arbitrary accuracy with careful selection of kernels/activation functions. These include bi-classifiers such as support vector machines 531, neural networks 534, extreme learning machines 535, or probabilistic classifiers such as Bayesian classifiers 532 or Gaussian process classifiers 533.

As an exemplar classification algorithm, consider a 2-norm soft margin support vector machine (SVM) classifier 531 trained on a dataset D by solving the optimization problem $$(w_j^{\hat{a}}, b_j^{\hat{a}}, \xi_j^{\hat{a}}) := \operatorname{argmin}_{w,b,\xi} w^T w + c \xi^T \xi \quad (11)$$

$$\text{subject to}: z_{i,j}(w^T \varphi(x_i) + b) \geq 1 - \xi_i,$$

$$\forall i = 1, \ldots, N_x.$$

Here, $c > 0$ is a regularization constant, w quantifies the margin of separation, b is a bias term, $\xi$ are slack variables, and $\varphi$ is a feature map into a reproducing kernel Hilbert space for a kernel function K. The decision function of the SVM is given by $$\psi_j(x) = \operatorname{sign}((w_j^{\hat{a}})^T \varphi(x) + b_j^{\hat{a}}),$$

where the inner product $(w_j^{\hat{a}})^T \varphi(x)$ can be expressed efficiently by the kernel function K. Since the classifiers may not be a true inner approximation of a robust parameter invariant set without an infinite number of features, a heuristic that can be employed to ensure constraint satisfaction is by choosing a small $\varepsilon > 0$ and checking that $\psi_j^{\hat{a}} > \varepsilon$ rather than $\psi_j^{\hat{a}}(x_t) > 0$. This forces the state to lie in the interior of the set rather than on the boundary. In this way, the hyperparameter $\varepsilon$ trades-off safety and performance.

In some embodiments, the learner can be updated on-line or incrementally, rather than solving the entire learning problem (11) at each time step.

Figure 5D:
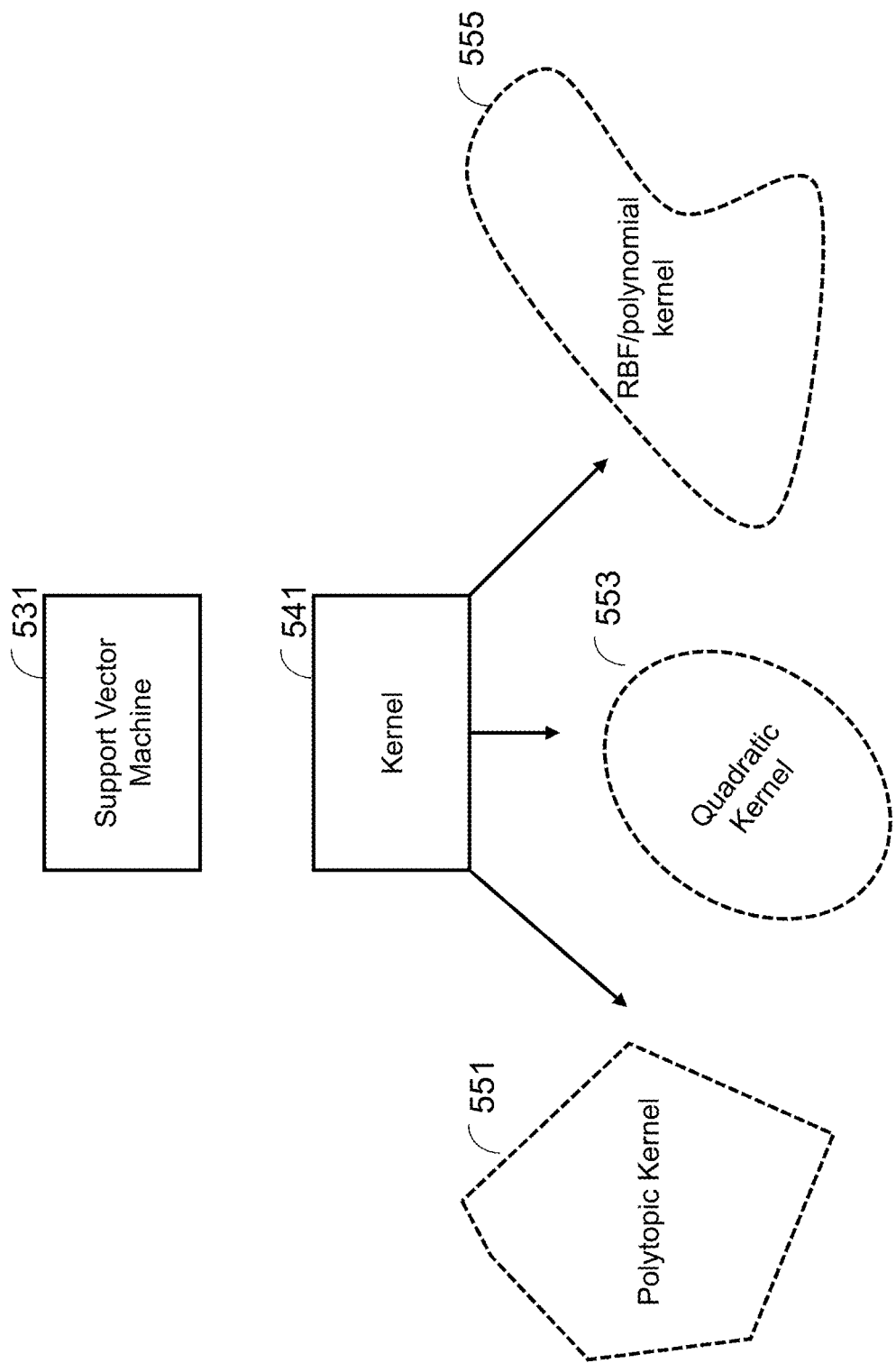
FIG. 5D shows different types of CAIS that can be generated by SVM kernels, according to some embodiments of the present disclosure.

FIG. 5D provides an overview of kernels 541 used in support vector machine based learning 531. Different shapes of invariant sets can be constructed by using, for example, polytopic kernels 551, quadratic kernels 553, or for irregular shapes, radial basis function or polynomial kernels 555.

Figure 6A:
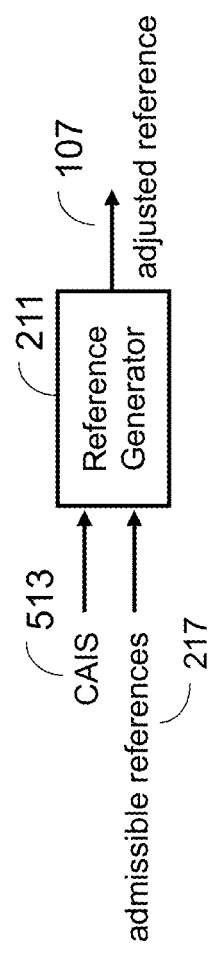
FIG. 6A shows the inputs and outputs of a reference generator, according to some embodiments of the present disclosure.

FIG. 6A shows a schematic of the reference generation module 211 in the ARG 103. The updated CAIS 513 obtained from the learning module 221 and the set of admissible reference 217 are used to computed adjusted references that satisfy the output constraints.

According to one embodiment, a solution to (8) is computed efficiently using machine learning and gridding V. Placing a grid on V, along with the constraints, imply that the solution to (8) is contained within the sub-grid of V defined by $$\tilde{V}_t := [\min\{r_{t,k}, v_{t,k}\}, \max\{r_{t,k}, v_{t,k}\}]. \quad (10)$$

Then, we can recast the problem (8) as a grid search, $$v_t := \operatorname{argmin}_{v \in \tilde{V}_t} (v - r_t)^2$$

$$\text{subject to}: (v, x_t) \in O(\hat{\Theta}_t),$$

$$v \in V_\varepsilon(\hat{\Theta}_t).$$

Solving the grid search then becomes identical to selecting the node $v_j$ on the grid $\tilde{V}_t$ that minimizes the cost while ensuring that $\psi_j(x_t) > 0$; that is, the current state is predicted by the j-th classifier to belong to the robust parameter invariant set induced by $\hat{\Theta}_t$.

Figure 6B:
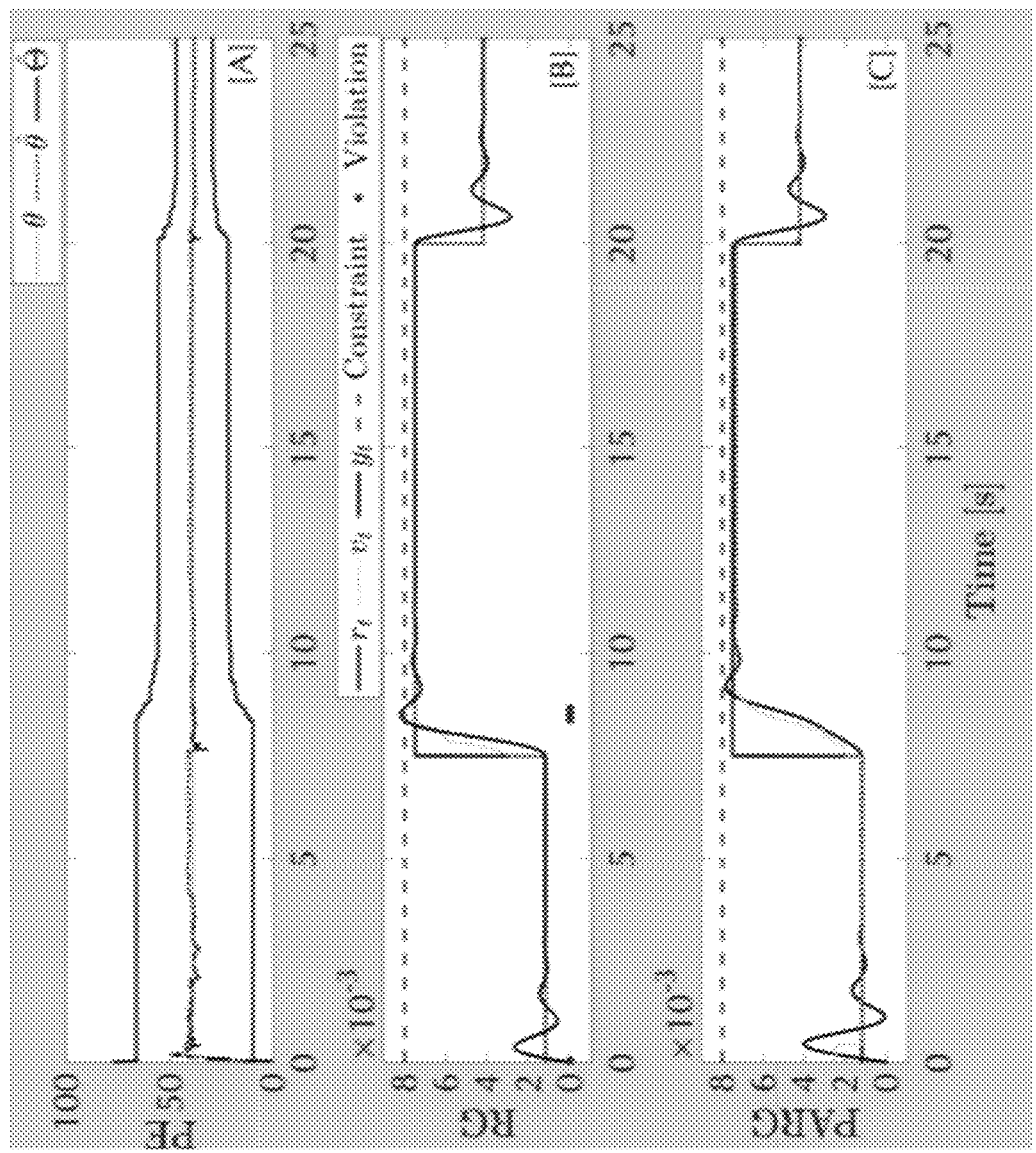
FIG. 6B are examples illustrating some dynamics seen during the evolution of the invariant sets, according to embodiments of the present disclosure.

FIG. 6B shows examples illustrating some dynamics seen during the evolution of the invariant sets, according to embodiments of the present disclosure. FIG. 6B compares the performance of the learning-based PARG to a non-adaptive RG which assumes a parameter value of $\hat{\theta} = 45$, which is the point estimate $\hat{\theta}$ after 0.1 s (which means 100 data points, since $\tau$=0.001). The output of the parameter estimator is shown in subplot [A] (dotted line) along with the true parameter value (green continuous line). The point estimate $\hat{\theta}$ converges to a small neighborhood around $\theta$ within 1 s, and the 99% confidence intervals (blue continuous lines) start contracting to a tight set around $\theta$ around 20 s. Note that the contractions of $\hat{\Theta}_t$ occur when the desired reference $r_t$ jumps and $v_t$ varies. This happens because the $v_t$ transient dynamics excite the closed-loop system and parameter estimation is abetted by satisfaction of weak persistence of excitation conditions. In subplot [B] and [C], we illustrate the benefit of the learning-based PARG. In subplot [B], we see that the non-adaptive RG cannot satisfy constraints at all time t≥0 because the constraint admissible set is generated based on an incorrect estimate of $\theta$. Conversely, as evident from subplot [C], the PARG, which uses parameter-robust constraint admissible set, does not violate constraints anywhere.

It is noted that since the system is nonlinear, the invariant sets are non-convex and require local radial basis function kernels to represent their geometries. In subplot [A], we see that, for a fixed $v_t$, the sets expand with time; each updated state shares the same colored dot as the corresponding invariant set. The expansions occur because the intervals $\hat{\Theta}_t$ contract and so the invariant sets can be less conservative for the same $v_t$. When $v_t$ changes, as in subplot [B], the shapes of the sets alter according to how close they are to the constraints. However, as expected, the states always lie within the invariant sets, which is why constraints are never violated.

Figure 7:
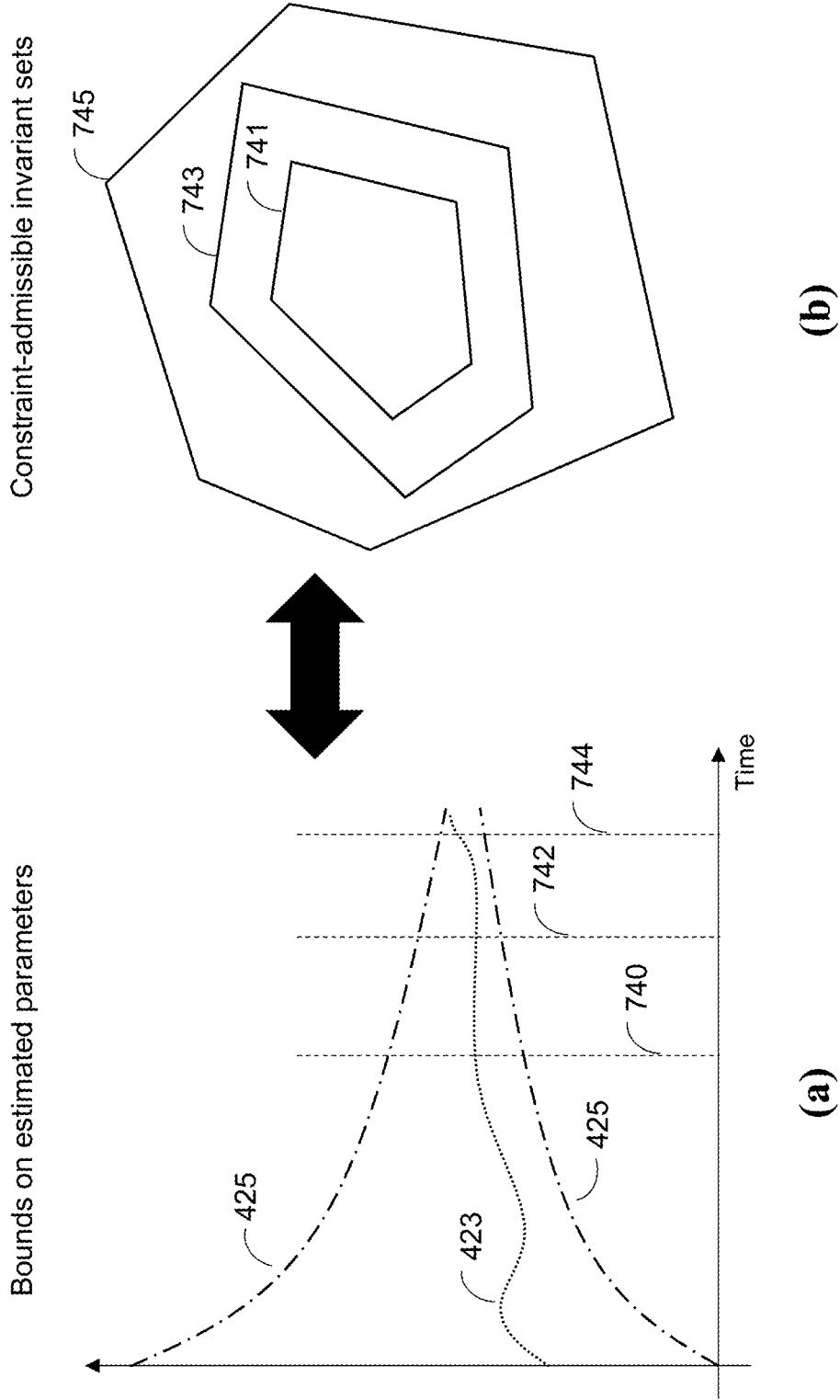
FIG. 7 describes the evolution of CAIS with the variation of confidence intervals on estimated parameters, according to some embodiments of the present disclosure.

FIG. 7 shows examples of updated CAIS based on gradually contracting bounds 425 around the point estimate 423 at increasing time instants 740, 742, 744. Since the uncertainty around the time instant 740 is higher (interval is larger), the corresponding invariant set is tighter 741, but as the bounds shrink from 740 to 742 to 744, the corresponding CAIS expands from 741 to 743 to 745. In some embodiments, the expansion may completely alter the shape of the CAIS such as 743 to 745.

Figure 8:
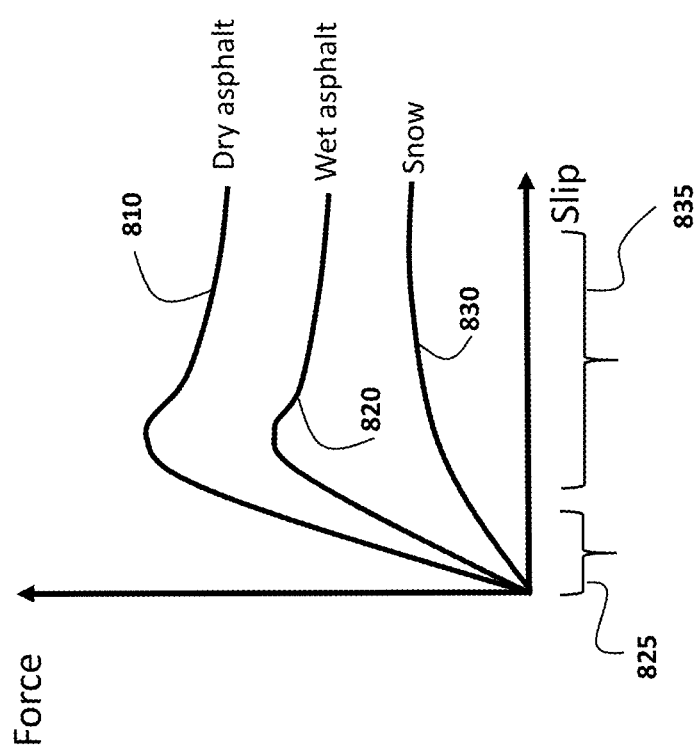
FIG. 8 is a schematic illustrating different friction functions used to control the motion of a vehicle, according to some embodiments of the present disclosure.

Some embodiments of the disclosure use the ARG 103 for enforcing constraint when the coefficient between tire and road is uncertain. FIG. 8 shows a schematic of different friction functions used by some embodiments to control the motion of a vehicle. The friction functions illustrate how the magnitude of the force on a tire of vehicle traveled on a road varies with the slip for different types of the surface of the road such as dry asphalt 810, wet asphalt 820, and snow 830 surfaces. The tire-force relationship is highly nonlinear and also depends on other quantities, such as tire pressure, vehicle mass, tire temperature, and wear on the tire. As used herein, a vehicle can be any type of wheeled vehicle, such as a passenger car, bus, or rover.

FIG. 8 shows an exemplar situation when all other quantities except the slip are kept fixed. This is a per se method of illustrating the tire-force relationship. The figure can illustrate the longitudinal force, in which case the slip is defined in terms of the difference of the longitudinal velocity and the rotational speed of the wheel normalized by either the rotational speed of the wheel or the longitudinal velocity, whichever one is greater. FIG. 8 can illustrate the lateral force, in which case the slip is defined in terms of a ratio between the wheel's lateral and longitudinal velocity components.

During normal driving 825, in which case the slip is small, the friction function includes an initial slope defining a stiffness of the tire. As used herein, the normal driving is defined as regular driving, e.g., everyday driving in urban areas, where the vehicle avoids emergency braking and evasive steering maneuvers. The normal driving can be contrasted with aggressive driving when extensive force is applied on the wheels of the vehicle. As used herein, the aggressive driving is defined as driving where braking/acceleration and/or steering torque is large enough such that the vehicle operates close to the tire adhesion limits of material of the tires. For example, while the validity of the linear region of the tire force function varies between different surfaces, approximating the tire force function with a linear function is valid for accelerations up to roughly 4 m/s$^2$ on asphalt surfaces, i.e., approximately 40% of the total available force on asphalt. As an example, production-type electronic stability control systems (ESC) measure a deviation from a predicted measurement, using a steering wheel angle and a longitudinal velocity, to a vehicle model using the tire force function as a linear approximation. When the deviation is more than a threshold, safety braking is activated. Thus, a measure of normal driving is driving well below these activation thresholds. In other words, if the driving is not aggressive, the driving is normal.

During the aggressive driving 835 the wheel slips more, which causes a larger force/friction variation. This variation is highly non-linear. For example, regardless of the extent of the force and type of the road, there is a maximum friction for almost all surfaces, which occurs at a point from which the force decreases when applying more braking/steering torque. After this point the increase in wheel slip results in smaller tire forces. For large wheel slip beyond the maximum force it becomes more difficult to maintain a desired wheel slip, since the dynamics becomes unstable beyond the point of maximum force. Therefore, vehicles are often controlled such that the wheel slip stays small enough such that the peak is not exceeded.

Hence, the friction function includes a linear part roughly corresponding to normal driving and a non-linear part corresponding to aggressive driving. During the normal driving, the friction function changes slowly and predictably. In addition, usually, the vehicle is controlled with force consistent with the normal driving. Such a control is safer and gives time and sufficient data allowing learning the linear part of the friction function during the control of the vehicle and to use the learned part of the friction function for vehicle control. For example, some embodiments use a filter configured to determine the current state of the stiffness of the tire by comparing a current state of the vehicle estimated using the stiffness of the tire with measurements of the current state of the vehicle. In other words, it is possible and safe to learn linear part of the friction function in real time during the control of the vehicle.

In contrast, the aggressive driving changes the friction function rapidly and non-linearly. Hence, controlling the vehicle using values of the linear part of the friction function can jeopardize accuracy and safety of vehicle control. In addition, non-linear variations of the friction function during the aggressive driving and relatively short time when a vehicle is driven under a specific style of the aggressive driving make the learning of the non-linear part of the friction function impractical. Hence, there is still a need for a method that can rapidly estimate non-linear part of the friction function during a real-time control of the vehicle.

Figure 9A:
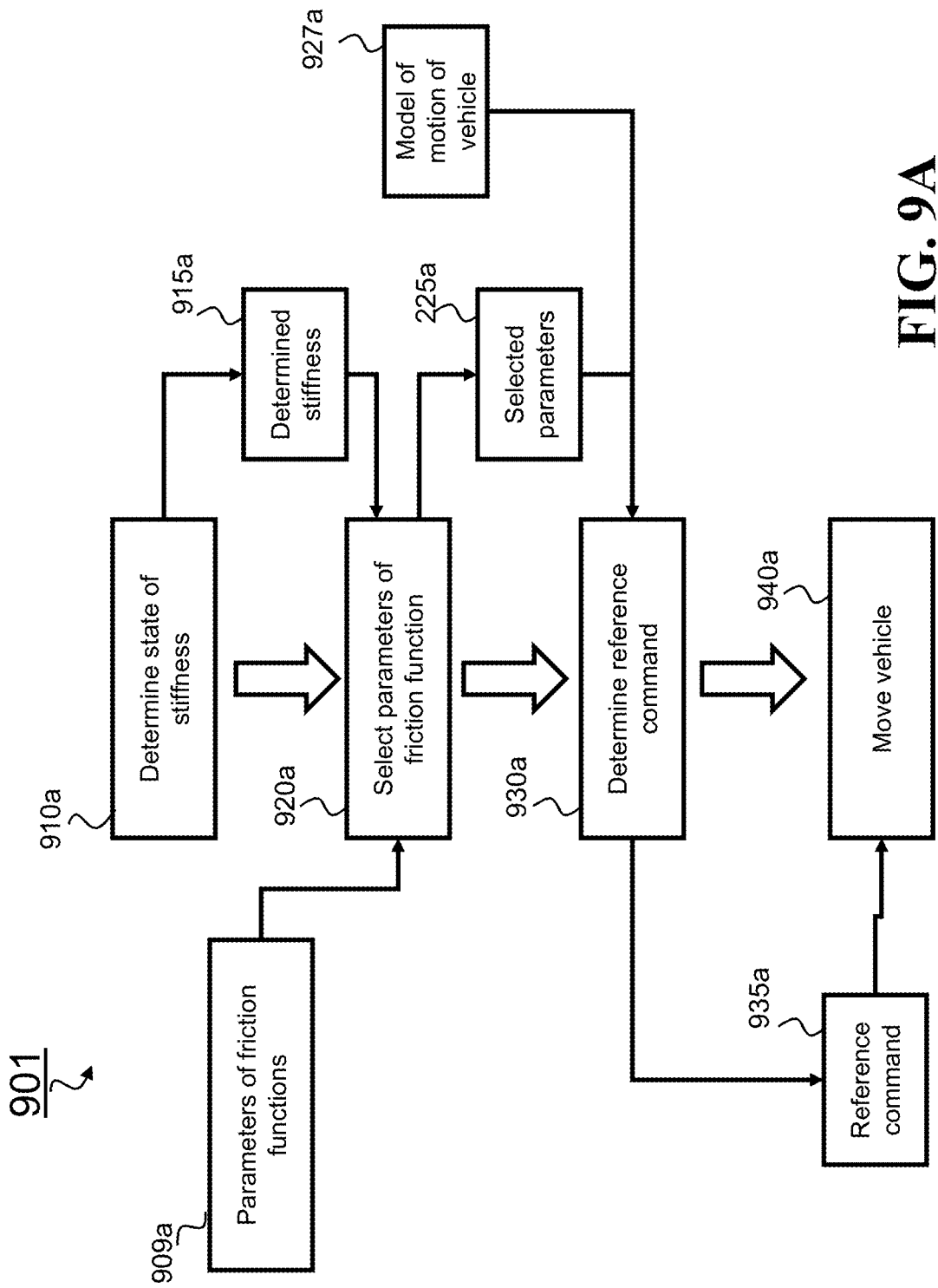
FIG. 9A shows a block diagram of one iteration of a method for controlling a vehicle moving on a road, according to some embodiments of the present disclosure.

FIG. 9A shows a block diagram of one iteration of a method 901 for controlling a vehicle moving on a road, e.g., controlling the vehicle according to a reference trajectory of desired vehicle positions and velocities along the road. This embodiment is based on the recognition that the stiffness determined for normal driving can be used to select from a memory one of the multiple parameters of friction functions. The method can be implemented using a processor of the vehicle.

The method 901 determines 910a a current state of stiffness 915a of at least one tire of the vehicle and accesses parameters 909a of multiple friction functions stored in a memory. Each friction function describing a friction between a type of surface of the road and a tire of the vehicle as a function of slippage of the vehicle, the parameters of each friction function include an initial slope of the friction function defining a stiffness of the tire and one or combination of a peak friction, a shape factor and a curvature factor of the friction function.

Figure 9B:
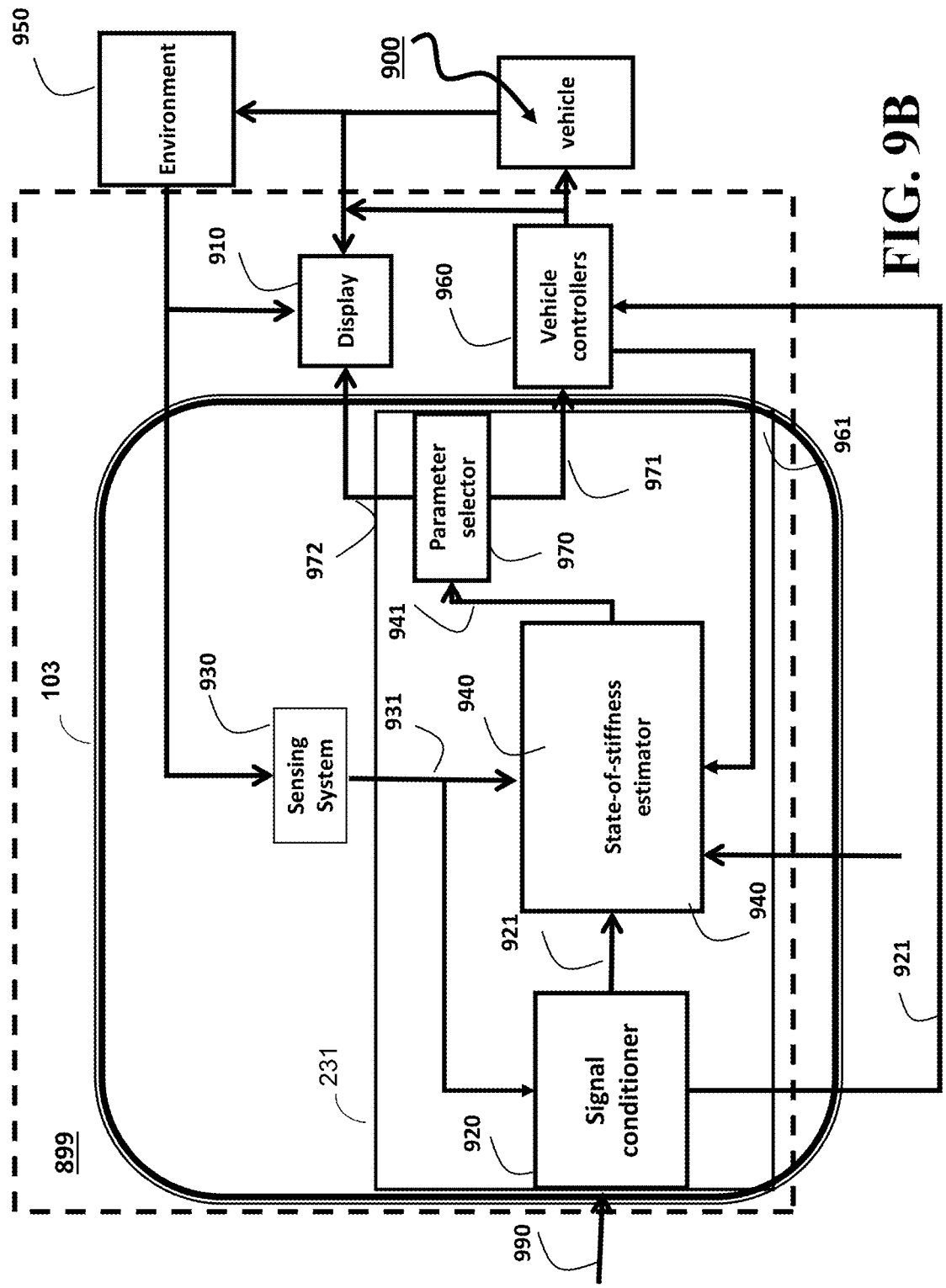
FIG. 9B is illustrates a general block diagram of a control system for controlling a vehicle, according to embodiments of the present disclosure.

Next, using the determined stiffness 915a, the method selects 920a a set of parameters 925a corresponding to a particular friction function. Using a model of motion of the vehicle 927a including the selected parameters 925a, the method 901 determines 930a, using an ARG 103, a modified reference command 935a, and submits the reference command 935a to a controller of the vehicle to move the vehicle 940a on the road. FIG. 9B illustrates a general block diagram of a control system 899 including the ARG 103 for controlling a vehicle 900 moving on a road and interacting with the environment 950. Different component of the control system 899 can be implemented using one or several processors operatively connected to a memory and/or various types of sensors of the vehicle. As used herein, a vehicle can mean any wheeled vehicle, including a passenger car, a bus, or a mobile robot. The vehicle can be an autonomous vehicle, semi-autonomous vehicle, or a standard vehicle equipped with active safety systems such as electronic stability control (ESC) and/or ABS. The control system 899 can be internal to the vehicle 900 and the implementation of the different components of the control system 899 can depend on the type of the vehicle. For example, depending on the type of the vehicle, the controllers 960 that generate the control commands to actuators of the vehicle 960 can vary.

The control system 899 includes a signal conditioner 920 that receives information 290 and produces estimates of the wheel speed for some or all wheels 921. The information 990 can include wheel-speed measurements from ABS, engine torque and rotation speed, and/or brake pressure. The control system 899 can also include a sensing system 930 that measures inertial components of the vehicle, such as rotation rate of the vehicle and acceleration of the vehicle, using an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 899. The sensing system 930 can also receive global position information from a global positioning system (GPS) or equivalent.

The control system 899 also includes a state-of-stiffness estimator 940 for determining parameters of the state of the stiffness. In some embodiments, the state-of-stiffness estimator includes a filter that iteratively determines the state of the vehicle and the state of stiffness, from a state of the vehicle and a state of stiffness determined during previous iterations. In some implementations, a state of the vehicle includes velocity and heading rate of the vehicle, but can also include a position, heading, and additional quantities related to the motion of the vehicle.

The state-of-stiffness estimator 940 uses information 931 from the sensing system and wheel-speed estimates 921 from the signal conditioner 920. If the sensing system 930 is equipped with an IMU for measuring the longitudinal acceleration of the vehicle, the measurements from the IMU can be used to determine parameters related to the longitudinal friction of the tire. However, if the sensing system 930 does not possess information about longitudinal acceleration, the signal conditioner 920 can output an estimate 921 of the longitudinal acceleration based on the wheel-speed estimates and other quantities according to other embodiments. Additionally, or alternatively, the state-of-stiffness estimator 940 can determine an estimate of the longitudinal acceleration based on the wheel-speed information 921.

In one embodiment, the states of the vehicle and parameters determining the tire to road interaction are estimated iteratively by combining wheel-speed and IMU information. In another embodiment, the friction-estimation system only includes lateral components. In such a case, the information 921 can include necessary information for the longitudinal motion. The state-of-stiffness estimator 940 can also receive information 961 about the vehicle motion from the vehicle-control units 960. The information can include a state of the vehicle, such as position, heading, velocity, and is received either from hardware or software, connected directly or remotely to the machine.

For example, the state-of-stiffness estimator can output state of stiffness 941 including friction values, tire-stiffness values, certainty levels of the tire stiffness, or combinations thereof. The control system 899 also includes a parameter selector 970 that uses the state of stiffness 941 to determine a set of parameters 971 describing a tire-friction function, where the parameters for multiple tire-friction functions are stored in a memory.

The control system 899 includes vehicle controllers 960 that use the selected parameters 971 to generate control commands to one or multiple actuators of the controlled vehicle. For example, in one embodiment, the parameters are used in a motion model of the vehicle to control the vehicle using a model predictive controller (MPC). The vehicle controllers 960 can include stand-alone components, such as ABS, ESC, or ADAS, or a combination of vehicle controllers that enable autonomous driving features. For example, the selected parameters can output 972 a friction coefficient corresponding to the parameters to be displayed on a display 910 of the vehicle as supervisory components to a driver of the vehicle.

To avoid determining the current friction coefficient and the entire tire friction function, one implementation stores in a database the parameters. In one embodiment, the motion model is modeled as a single-track model with nonlinear $$\dot{v}_x - v_y\dot{\psi} = \frac{1}{m}(F_{x,f}\cos(\delta) + F_{x,r} - F_{y,f}\sin(\delta)),$$

$$\dot{v}_y + v_x\dot{\psi} = \frac{1}{m}(F_{y,f}\cos(\delta) + F_{y,r} + F_{x,f}\sin(\delta)),$$

$$I_{zz}\ddot{\psi} = l_f F_{y,f}\cos(\delta) - l_r F_{y,r} + l_f F_{x,f}\sin(\delta),$$

tire force as, where the nominal forces are modeled using the Pacejka tire model as $$F_{0,i}^x = \mu_i^x F_i^z \sin(C_i^x \arctan(B_i^x(1-E_i^x)\lambda_i + E_i^x \arctan(B_i^x \lambda_i))),$$

$$F_{0,i}^y = \mu_i^y F_i^z \sin(C_i^y \arctan(B_i^y(1-E_i^y)\alpha_i + E_i^y \arctan(B_i^y \alpha_i))),$$

where the nominal forces are the forces under pure slip, i.e., when one of the longitudinal slip and lateral slip are zero.

Some embodiments, instead of determining the tire parameters in the Pacejka model, to be used in the tire friction function, use a linear approximation of the tire forces as $F^x \approx C_s^x \lambda$, $F^y \approx C_s^y \alpha$, for the longitudinal and lateral tire force, where the C constants are the stiffness components. Consequently, one embodiment estimates the stiffness component using a stochastic model of the stiffness as a disturbance to the motion model, $C_s^x = C_{s,n}^x + \Delta C_s^x$, $C_s^y = C_{s,n}^y + \Delta C_s^y$ where $C_{s,n}$ is the nominal stiffness value, for example, a priori determined on a nominal surface, and $\Delta C_s$ is a time-varying, unknown part which is estimated according to one embodiment. One implementation estimates the mean value and variance of the tire stiffness.

Additionally or alternatively, one embodiment estimates the tire stiffness and compares to the tire parameters stored in memory according to a linear approximation of the Pacejka model, $F^y \approx \mu_i^y F_i^z C_i^y B_i^i \alpha_i$, which gives that the tire stiffness and parameters should be equal, $\mu_i^y F_i^z C_i^y B_i^i = C_i^y$. However, since measurement and estimation errors, and nonperfect parameters stored in memory, give tire stiffness estimates that deviate from the ones stored in memory, one embodiment uses the estimated variance of the tire stiffness to determine the best fit according to the parameters, by selecting the parameters maximizing the likelihood of the parameters, $$\theta^* = \underset{\theta \in \Theta}{\arg\max} \mathcal{N}\left(\mu_i^y F_i^Z C_{i,j}^y B_{i,j}^y \big| C_k, \sum\nolimits_k\right).$$

Yet another embodiment uses a test statistic to determine whether the estimated stiffness can be regarded as outliers or inliers from the parameters. Consequently, one embodiment choose the parameters $\theta_1$ corresponding to the lowest friction surface if $T(\mu_{i,1}^y F_i^z C_{i,1}^y B_{i,1}^y) > x_n^r(1)$, where $x_n^2(1)$ is the Chi-squared distribution with one degree of freedom and some significance level $\eta$. Otherwise, the embodiment proceeds in order of increasing peak friction until a parameter set is found.

In some embodiments, constraints are imposed on the motion of the vehicle. For instance, one embodiment the constraints model a maximum allowed deviation from the middle lane of the road or a maximum heading rate of the vehicle, and one embodiment models a constraint as a maximum steering rate of the steering wheel of the vehicle.

Such constraints and the ability of a controller to satisfy such constraints are heavily dependent on the friction coefficient between at least one tire of the vehicle and the road. For instance, having a controller tuned for the friction coefficient corresponding to asphalt, if that controller is used to control a vehicle on snow, constraints such as maximum allowed deviation from the middle lane of the road are likely to be violated.

In some embodiments, the state-of-stiffness estimator 940 and subsequent parameter selector 970 is used to adapt the reference such that exemplified constraints are satisfied.

In one embodiment, the reference r is the velocity profile and steering profile to reach a desired point on the road. In other embodiments, the reference r is a timed path leading to a desired motion on the road. The reference is subject to various constraints, e.g., the velocity should obey speed limits, and the path should not deviate too much from the middle of the desired lane. For example, the steering profile should not except physical limits of the actuators.

In addition, for the reference governor to be able to make sensible decisions, the state-of-stiffness estimator outputs the determined state of stiffness of the vehicle, and the confidence of such stiffness. Referring to Eq. (7), the state-of-stiffness estimator provides the confidence bounds used by the reference governor. In one embodiment the state-of-stiffness estimator ensures contractivity according to other embodiments of the disclosure.

Figure 10A:
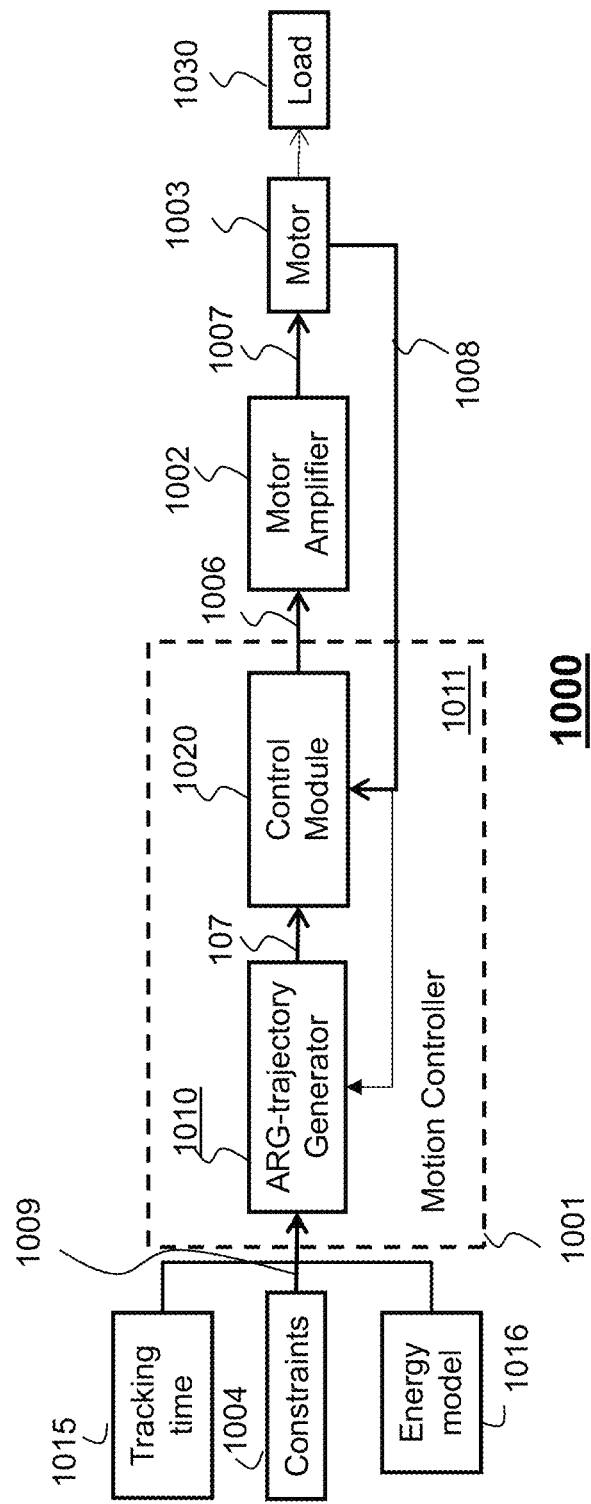
FIGS. 10A and 10B show an energy efficient motion control system including one or combination of a motion controller, according to some embodiments of the present disclosure.
Figure 10B:
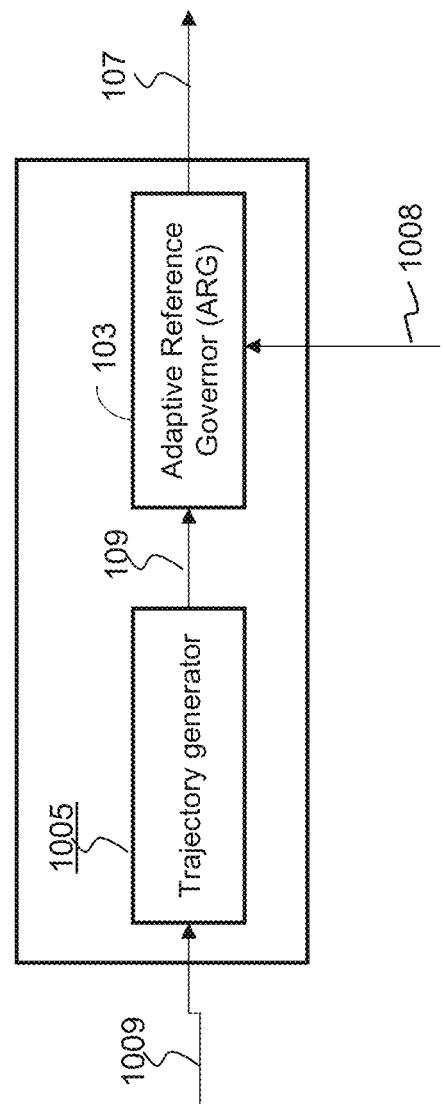

FIGS. 10A and 10B show block diagrams of a motion control system 1000 according to some embodiments of the present disclosure. The motion control system 1000 can be configured to perform a single axis positioning task, or a multiple axes positioning tasks. An example of the motion control system is a servo system.

As shown in FIG. 10A, the motion control system 1000, which can be referred as an ARG-enabled energy efficient motion control system 1000 that includes one or combination of a motion controller 1001, an amplifier 1002, and a motor 1003. The motion controller 1001 can further include an ARG-trajectory generation module 1010 and a control module 1020. The ARG-trajectory generation module 1010 receives constraints 1004, tracking time 1015, energy model 1016, and measured signal 1008 as inputs and outputs an energy efficient trajectory 107, as an example, of a motion of the motor of the motion control system to the control module 1020. The energy efficient trajectory can include one or combination of a control trajectory of a current input to the motor, a position trajectory of a position of the motor, a velocity trajectory of a velocity of the motor, and an acceleration trajectory of an acceleration of the motor. Typically, the control, the position, the velocity, and the acceleration trajectories are equivalent to each other, because, given the initial state of the motor, every trajectory uniquely determines the other three trajectories through the dynamics of the motor. As referred herein, the energy efficient trajectory is one or combination of abovementioned trajectories.

In some embodiment, the trajectory generator module 1005 determines the trajectory 1005 by minimizing a cost function subject to the constraints 1004. The cost function is determined based on an energy model 1016 of the system 1000 and a function of a tracking time 1015, as described below. The motion controller can be implemented using a processor 1011.

The control module 1020 determines a control signal 1006 based on the trajectory 107 and feedback signal 1008, and outputs the control signal 1006 to the amplifier 1002 which determines and outputs a current or voltage 1007 to the motor 1003. The motor is mechanically coupled with a load 1030, and drives the load to achieve specified tasks. In one embodiment, the feedback signal 1008 describes a current state of the motion control system. In another embodiment, the feedback signal 1008 describes a motion of the motor 1003. For example, in one variation of this embodiment, the feedback signal 1008 is a position of the motor.

In some embodiment, the constraints 1004 include a dynamic constraint that the motion system has to satisfy; velocity constraints limiting the speed that the motion system can operate; acceleration constraints limiting the acceleration that the motion system can have; and a control constraint limiting the voltage or current that the motor can accept.

In some embodiment, the constraints 1004 include a dynamic constraint that the motion system has to satisfy; velocity constraints, and acceleration constraints.

In some embodiments, the trajectory generation module 1005 determines trajectories according to a dynamic model of motor 1003 and physical constraint 1004. For example, the dynamics of the motor can be defined according to $$\begin{bmatrix} \dot{x}_1 \\ \dot{x}_2 \end{bmatrix} = \begin{bmatrix} 0 & 1 \\ 0 & d \end{bmatrix} \begin{bmatrix} x_1 \\ x_2 \end{bmatrix} + \begin{bmatrix} 0 \\ b \end{bmatrix} u + \begin{bmatrix} 0 \\ c \end{bmatrix}$$

where $x=(x_1, x_2)=(\theta, \omega)$ is a state of the motor state representing a position of the motor position and an angular velocity respectively, u is the control input to the motor, d, c are the viscous and coulomb friction coefficients of the motor, respectively, b is a constant coefficient, a single dot indicates the first derivative, and double dots the second derivate, $x_2$ is a second component of the state of the motor x representing an angular velocity of the motor. The embodiment of the control input to the motor depends on the type of the motor. In one embodiment, the control input to the motor includes a current input into the motor. Additionally, or alternatively the control input can include control signal of a voltage into the motor. FIG. 10B shows an example of an ARG-trajectory generator for a motor positioning system, according to some embodiments of the present disclosure.

In some embodiment, values of parameter d, b, c, in the motor model of the motion control system, reflecting characteristics such as inertia and friction coefficient, of the load 1030, are typically unknown in advance. The trajectory generator 1005 computes a trajectory 109 according nominal values of these parameters. Because of the mismatches between true parameter values of the nominal values used in 1005, the trajectory 109 is infeasible for the motion system to follow. For example, control input constraint, for example voltage required be applied to the motor exceeds its rated voltage, and thus endangers the safety of the entire motion system, or shorten its lifespan. Adaptive reference governor 103 estimates point values of parameters d, b, c and their confidence level from signal 1008, then reshape the infeasible trajectory 109 in time domain to produce a new trajectory 107 by slowing down acceleration or deceleration to enforce that all constraints with estimated parameters d, b, c are satisfied by 107.

In some embodiment, the trajectory generator computes a time optimal trajectory satisfying velocity and acceleration constraints to maximize productivity of the motion control system, where the velocity and acceleration constraints restrict the maximal velocity and acceleration that the motor can operate. For example, the velocity constraint is $$|x_2| \leq v_{max}$$

where $v_{max}$ is the maximum velocity. The acceleration constraint is $$dx_2 + c + bu - a_{max} \leq 0$$

$$-a_{max} - dx_2 - c - bu \leq 0,$$

where $a_{max}$ is a constant that defines the maximum acceleration. The time optimal trajectory computation does not require the knowledge of values of parameters d, b, c. This is expedient for embedded platforms with limited computing power, and thus the time optimal trajectory 109 could violate control constraint. ARG 103 incorporates estimated model parameters and reshapes 109 to produce a trajectory 107 with all constraints satisfied.

Figure 11A:
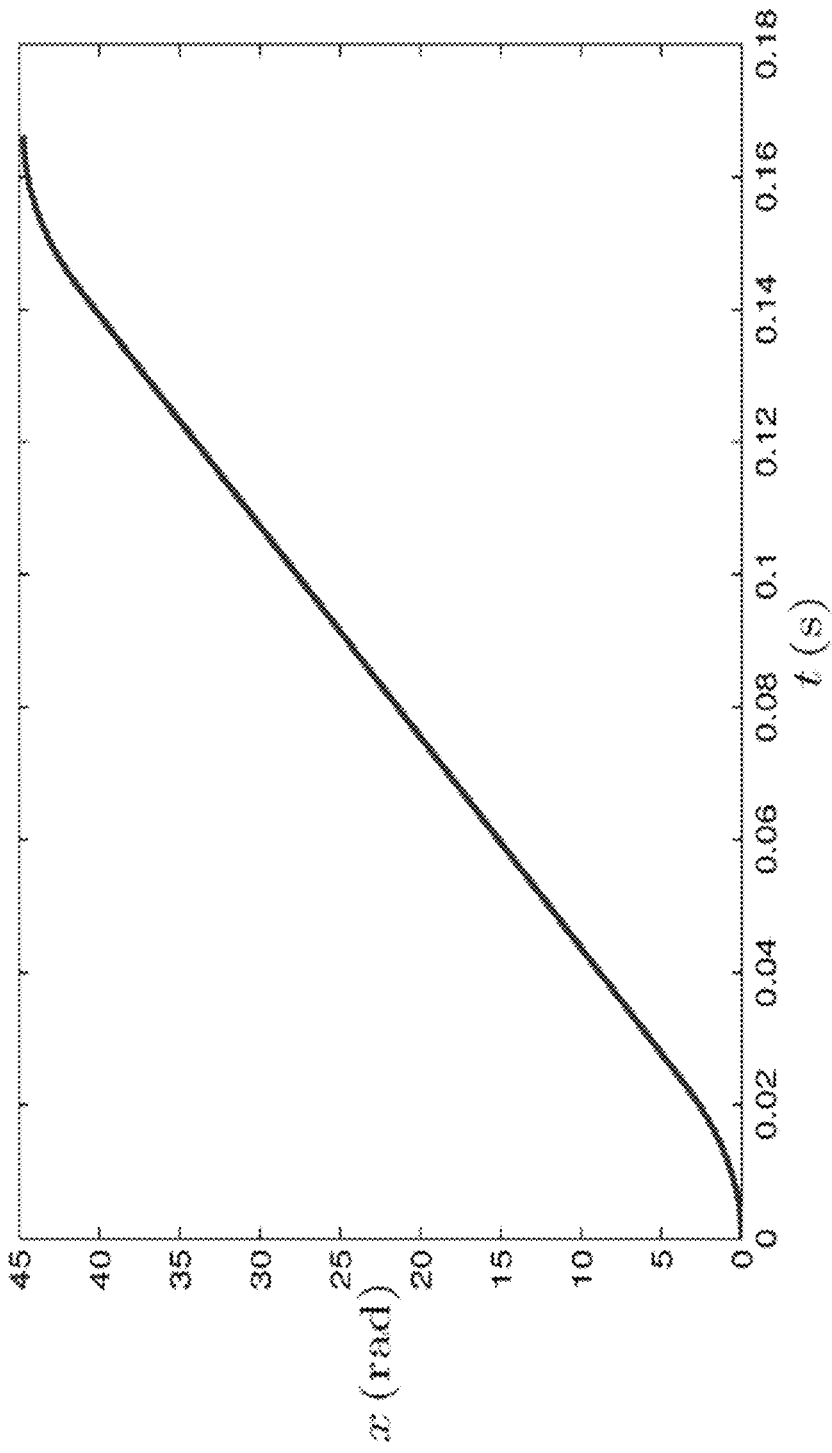
FIG. 11A and FIG. 11B show time optimal position trajectory and velocity trajectory along time axis, according to some embodiments of the present disclosure.
Figure 11B:
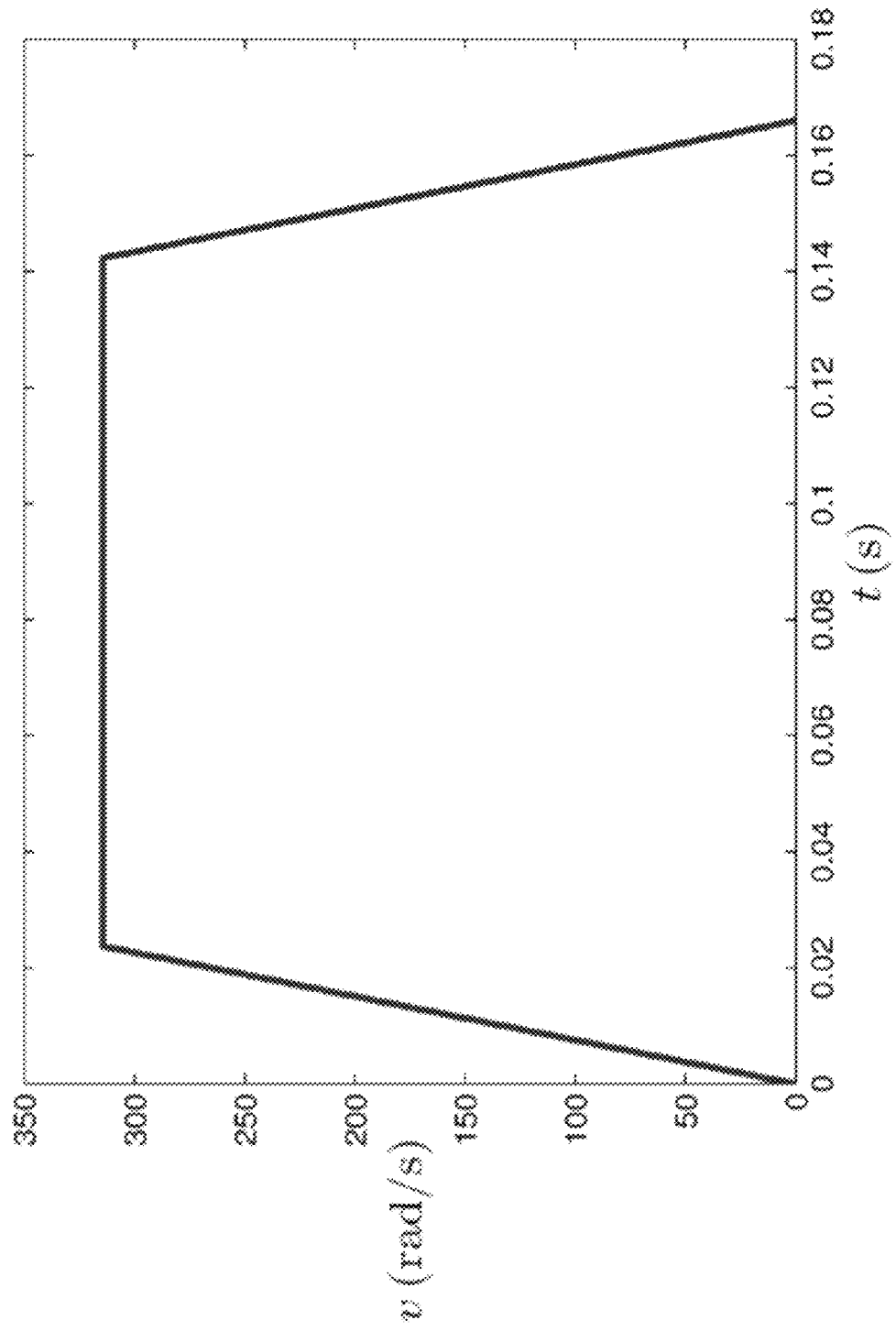

FIG. 11A-11B illustrates time optimal position trajectory and velocity trajectory along time axis. The time optimal trajectory is computed according the velocity and acceleration constraints: by always applying maximal acceleration $a_{max}$ during acceleration period or maximal deceleration $-a_{max}$ during deceleration period, or zero acceleration during maximal velocity period. The time optimal trajectories satisfy velocity and acceleration constraints.

The motor is typically subject to other physical constraints such as maximal current that can flow into the motor. In some embodiment, the physical constraint on the maximal current is given by $$|u| \leq u_{max}$$

Figure 11C:
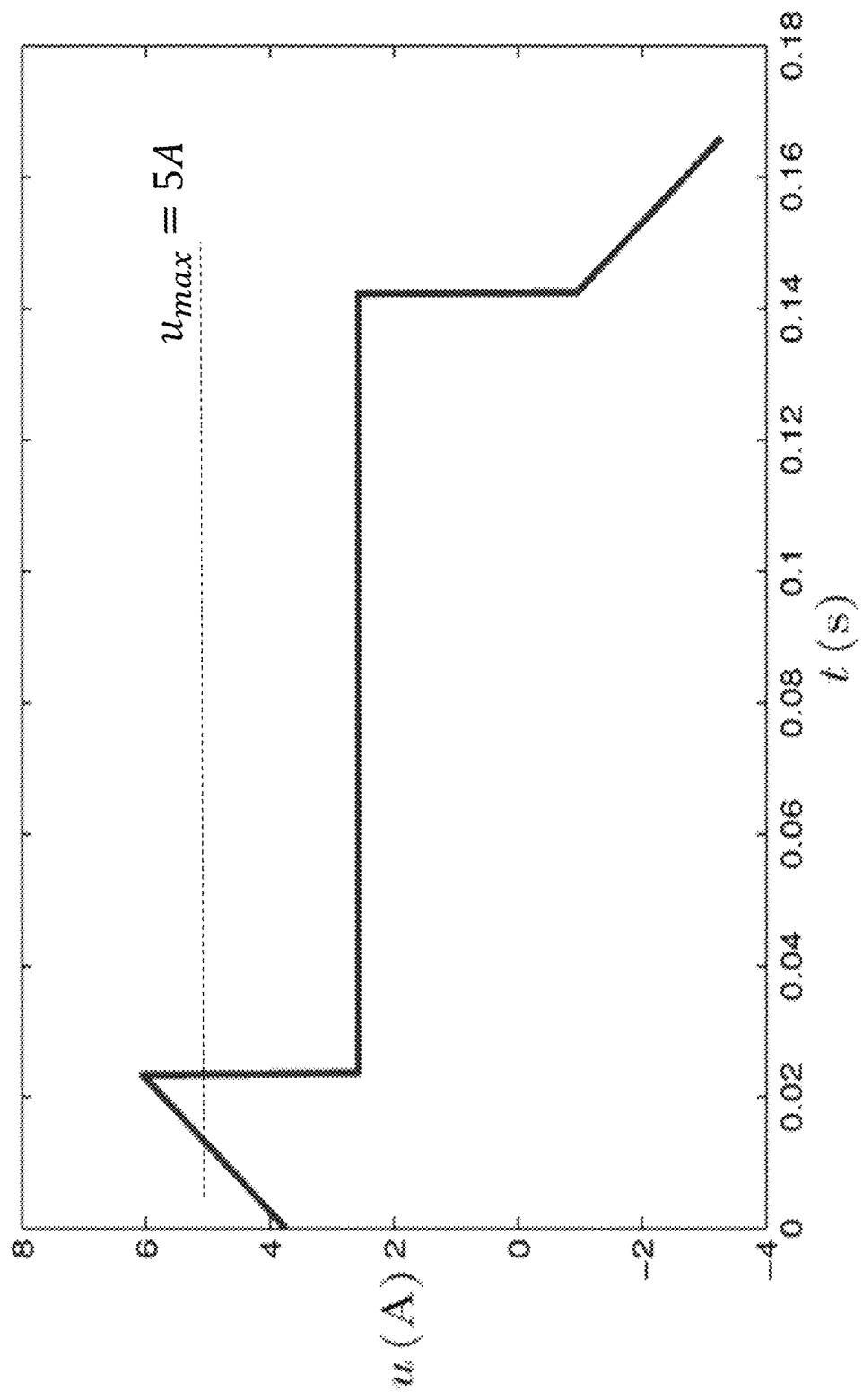
FIG. 11C shows plots the control input trajectory corresponding to the time optimal trajectories, according to some embodiments of the present disclosure.

FIG. 11C plots the control input trajectory corresponding to the time optimal trajectories. The control input, depending on model parameters d, b, c, in fact violates its constraint, and implies the time optimal trajectory is not feasible for the motor to follow. This is induced by the lack of knowledge of load-dependent model parameters d, b, c. According to some embodiments, ARG can estimate model parameters d, b, c, based on regular operational data, and reshape the time optimal trajectories according to physical constraints to make it feasible for the motor to execute.

In some embodiment, trajectory generator determines trajectories satisfying velocity, acceleration, and physical current/voltage constraints. The trajectory generation algorithm is computational expensive, as well as require a good knowledge of motor parameter values ensure constraint satisfaction and operation efficiency. According to some embodiments of the present disclosure, the adaptive reference governor can estimate model parameter values which can be fed into trajectory generator.

The embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A controller for controlling motion of a machine system having at least one motion actuator, comprising:
   an interface configured to accept a set of measured system states of the machine system indicative of one or more physical quantities defining the motion of the machine system, a desired reference input to the machine system and one or more constraints limiting operation of the machine system;
   a memory configured to store computer-executable programs including an adaptive reference governor (ARG); and
   a processor, in connection with the memory, configured to execute the ARG to:
      compute a system parameter estimate and a system state estimate for the machine system based on the set of measured system states, wherein the system parameter estimate corresponds to one or more uncertain system parameters affecting the motion of the machine system and that violate the one or more constraints;

compute a parameter-robust constraint admissible set based on the computed system parameter estimate and the system state estimate, wherein the parameter-robust constraint admissible set includes system states and reference inputs for which an output of the machine system satisfies the one or more constraints;

adjust the desired reference input, based on the parameter robust constraint admissible set to generate an adjusted reference input for the machine system;

generate one or more control commands based on the adjusted reference input and the system state estimate; and control the at least one motion actuator of the machine system in accordance with the one or more control commands to change a state of the motion of the machine system.

2. The controller of claim 1, wherein the machine system operates in a closed loop system.

3. The controller of claim 1, wherein the set of measured system states are a set of states stored in a storage of the machine system, wherein the set of states are measured while the machine was operated in a past period of time with respect to a time instance at which the system parameter estimate is computed.

4. The controller of claim 1, wherein the desired reference input is selected from a set of convex reference inputs.

5. The controller of claim 1, further comprising a learning program that dynamically learns constraint admissible sets by combining off-line data based on sampling and on-line data provided by a parameter estimator of the ARG.

6. The controller of claim 5, wherein the ARG includes a constraint-admissible invariant set (CAIS) learner configured to generate constraint-admissible sets by taking outputs of the parameter estimator.

7. The controller of claim 6, wherein the generated constraint-admissible sets are non-convex with respect to parameters of the system parameter estimate.

8. The controller of claim 6, wherein the CAIS learner is configured to utilize the system parameter estimate and stored state features and constraint-admissibility labels to learn an updated CAIS.

9. A method for controlling motion of a machine system having at least one motion actuator, comprising:

acquiring a set of measured system states of the machine system indicative of one or more physical quantities defining the motion of the machine system, a desired reference input to the machine system and one or more constraints limiting operation of the machine system;

computing a system parameter estimate and a system state estimate for the machine system based on the set of measured system states, wherein the system parameter estimate corresponds to one or more uncertain system parameters affecting the motion of the machine system and that violate the one or more constraints;

computing a parameter-robust constraint admissible set using an adaptive reference governor, based on the computed system parameter estimate and the system state estimate, wherein the parameter-robust constraint admissible set includes system states and reference inputs for which an output of the machine system satisfies the one or more constraints;

adjusting the desired reference input, based on the parameter robust constraint admissible set to generate an adjusted reference input for the machine system;

generating one or more control commands based on the adjusted reference input and the system state estimate; and controlling the at least one motion actuator of the machine system in accordance with the one or more control commands to change a state of the motion of the machine system.

10. The method of claim 9, wherein the system parameter estimate defines a confidence interval of at least some parameters of the machine system.

11. The method of claim 9, wherein the system parameter estimate is computed by a parameter estimator, the method further comprising:

dynamically learning constraint admissible sets by combining off-line data based on sampling, and on-line data provided by the parameter estimator.

* * * * *